United States Patent
Konuma et al.

(10) Patent No.: US 11,520,118 B2
(45) Date of Patent: Dec. 6, 2022

(54) LENS DRIVE DEVICE, CAMERA MODULE, AND CAMERA MOUNT DEVICE

(71) Applicants: Shinsuke Konuma, Tokyo (JP); Tomoyuki Murakami, Tokyo (JP); Shota Kudo, Tokyo (JP); Yohei Enta, Tokyo (JP)

(72) Inventors: Shinsuke Konuma, Tokyo (JP); Tomoyuki Murakami, Tokyo (JP); Shota Kudo, Tokyo (JP); Yohei Enta, Tokyo (JP)

(73) Assignee: MITSUMI ELECTRIC CO., LTD., Tokyo (JP)

( * ) Notice: Subject to any disclaimer, the term of this patent is extended or adjusted under 35 U.S.C. 154(b) by 553 days.

(21) Appl. No.: 16/311,729

(22) PCT Filed: Jun. 14, 2017

(86) PCT No.: PCT/JP2017/022000
§ 371 (c)(1),
(2) Date: Dec. 20, 2018

(87) PCT Pub. No.: WO2017/221791
PCT Pub. Date: Dec. 28, 2017

(65) Prior Publication Data
US 2019/0204532 A1    Jul. 4, 2019

(30) Foreign Application Priority Data
Jun. 24, 2016  (JP) .............................. JP2016-126022

(51) Int. Cl.
*G02B 7/09* (2021.01)
*G03B 5/00* (2021.01)
(Continued)

(52) U.S. Cl.
CPC .................. *G02B 7/09* (2013.01); *G02B 7/02* (2013.01); *G02B 7/04* (2013.01); *G02B 13/001* (2013.01); *G03B 5/00* (2013.01); *H04N 5/2254* (2013.01)

(58) Field of Classification Search
None
See application file for complete search history.

(56) References Cited

U.S. PATENT DOCUMENTS 10,725,313 B2 *  7/2020  Sugawara ................ G03B 5/06
2008/0297642 A1  12/2008  Osaka
(Continued)

FOREIGN PATENT DOCUMENTS

JP    2012-177753 A    9/2012
JP    2013-210550 A    10/2013
(Continued)

OTHER PUBLICATIONS

International Search Report from International Application No. PCT/JP2017/022000 dated Sep. 12, 2017.

*Primary Examiner* — Christopher Stanford
*Assistant Examiner* — Journey F Sumlar
(74) *Attorney, Agent, or Firm* — Brundidge & Stanger, P.C.

(57) ABSTRACT

This lens drive device 1 comprises: an autofocus drive unit for performing autofocus using a driving force of a voice coil motor configured from a first coil part 112 and a magnet part 122; and a shake correction drive unit for performing shake correction using a driving force of a voice coil motor configured from a second coil part 231 and the magnet part 122. The magnet part 122 includes first magnets 122A, 122C disposed at two mutually facing sides among the four sides of a substantially rectangular-shaped lens drive device in a plan view, and a second magnet 122B disposed at another side. The side the second magnet 122B faces is designated (Continued)

a no-magnet disposed section R where no magnet is disposed.

10 Claims, 21 Drawing Sheets

(51) Int. Cl.
  *G02B 7/04* (2021.01)
  *G02B 7/02* (2021.01)
  *G02B 13/00* (2006.01)
  *H04N 5/225* (2006.01)

(56) References Cited

U.S. PATENT DOCUMENTS

| | | | |
|---|---|---|---|
| 2015/0177479 A1* | 6/2015 | Lee | H02K 41/0356 |
| | | | 359/824 |
| 2015/0316744 A1* | 11/2015 | Chen | G03B 19/22 |
| | | | 359/824 |
| 2015/0323758 A1* | 11/2015 | Lee | G02B 7/08 |
| | | | 359/824 |
| 2017/0192195 A1 | 7/2017 | Murakami | |

FOREIGN PATENT DOCUMENTS

| | | |
|---|---|---|
| JP | 201620939 A | 2/2016 |
| KR | 1020080105988 A | 12/2008 |
| KR | 101389375 B1 | 4/2014 |

* cited by examiner

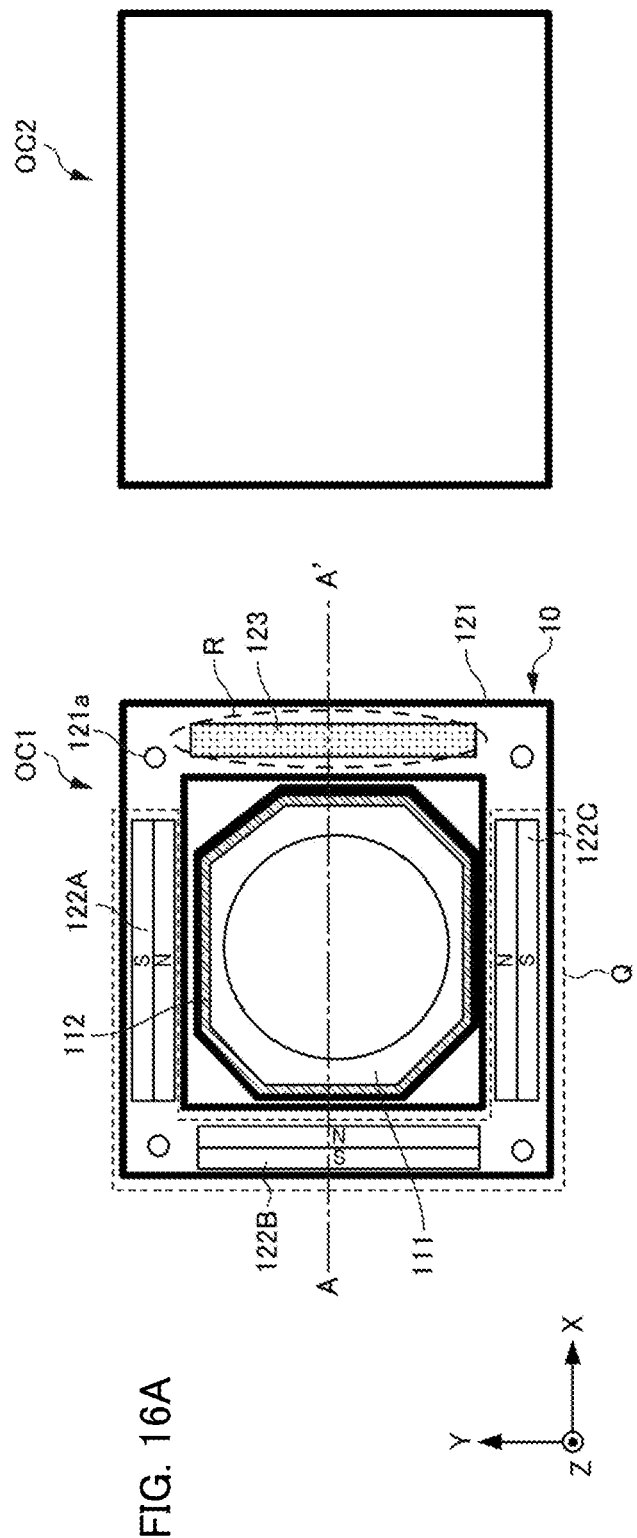

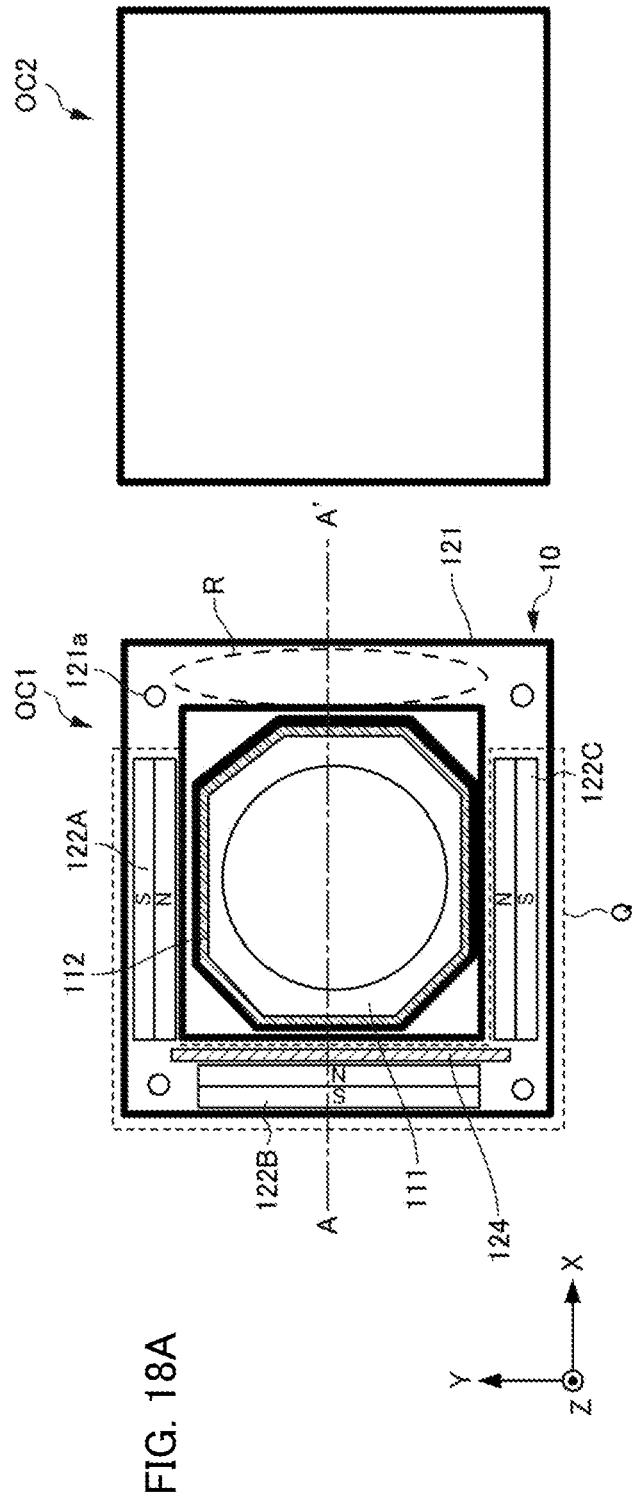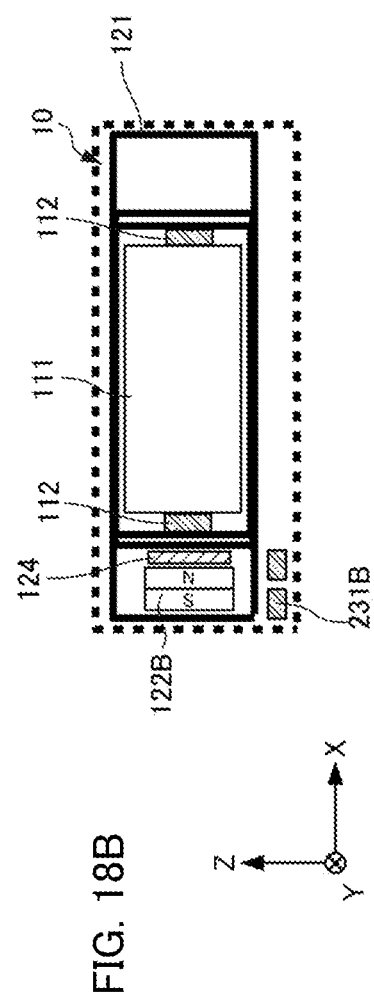
FIG. 18A
FIG. 18B

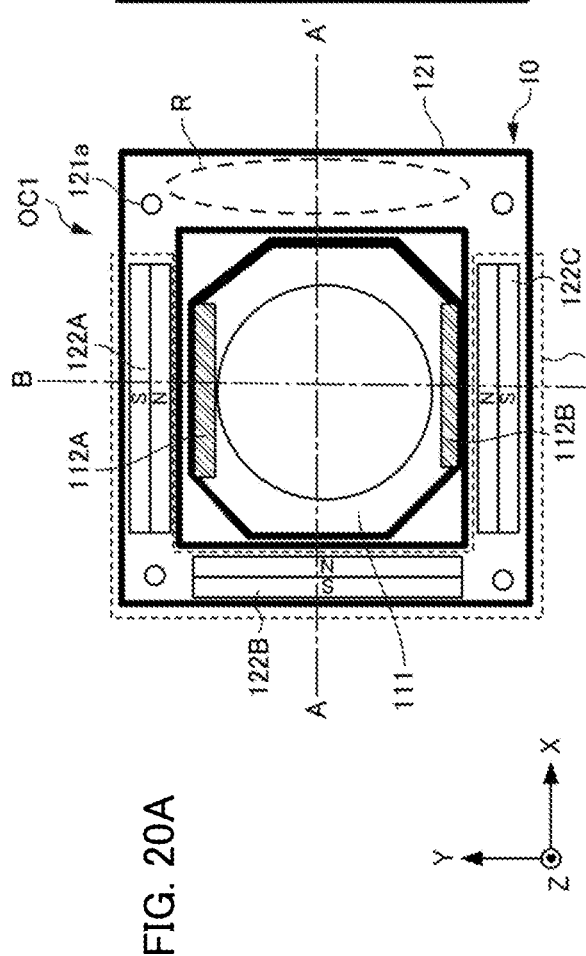
FIG. 20A
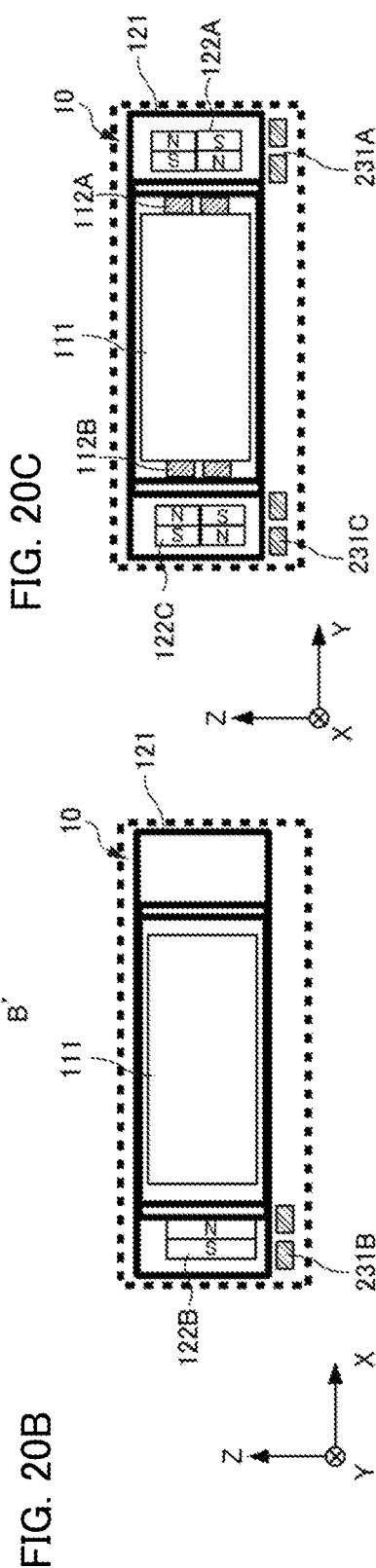
FIG. 20C
FIG. 20B

LENS DRIVE DEVICE, CAMERA MODULE, AND CAMERA MOUNT DEVICE

TECHNICAL FIELD

The present invention relates to a lens driving device, a camera module, and a camera mount device.

BACKGROUND ART

In general, a small-sized camera module is mounted in mobile terminals, such as smartphones. A lens driving device having an autofocus (hereinafter, referred to as Auto Focus, "AF" for short) function of automatically performing focusing during capturing of a subject and a shake-correcting function (hereinafter, referred to as Optical Image Stabilization, "OIS" for short) function for optically correcting vibration caused during capturing of an image is applied in such a camera module.

Patent Literature (hereinafter, referred to as "PTL") 1 and PTL 2, for example, disclose achieving the AF function and the OIS function using a voice coil motor composed of a magnet and a coil.

CITATION LIST

Patent Literature

PTL 1
Japanese Patent Application Laid-Open No. 2013-210550
PTL 2
Japanese Patent Application Laid-Open No. 2012-177753

SUMMARY OF INVENTION

Technical Problem

Recently, camera modules including a plurality of lens driving devices, such as dual cameras, have been put to practical use. The dual cameras offer various possibilities according to situations where each of the dual cameras is used, such as a possibility that two images at different focal lengths can be captured at the same time, a possibility that a still image and a video image can be captured simultaneously, or the like.

However, two lens driving devices are disposed adjacently to each other in the dual camera. Accordingly, there is a risk that operation of one of the lens driving devices is made unstable due to magnetic interference by the other one of the lens driving devices when each of the lens driving devices is provided with a magnet and a coil for achieving the aforementioned AF and OIS functions. For example, in the lens driving devices of PTL 1 and PTL 2, the magnet is disposed on the periphery of each of the lens driving devices, so that there is a risk that operation during AF and/or OIS is made unstable due to the magnetic field generated by one of the magnets and acting on the coil of the other lens driving device.

Meanwhile, when the two lens driving devices are spaced apart from each other to such an extent that they are not magnetically interfered with each other, it is commercially disadvantageous that the miniaturization of the camera module is prevented.

The present invention is made in view of the aforementioned problem, and intends to provide a lens driving device, a camera module, and a camera mount device that can reduce magnetic interference with another adjacent lens driving device and are preferable for use in a dual camera.

Solution to Problem

Principally, the present invention that solves the aforementioned problem is a lens driving device including an auto-focusing driving part including: a first coil part to be disposed at a periphery of a lens holder that holds a lens part; a magnet part to be disposed to be spaced apart in a radial direction from the first coil part; and a first supporting member configured to support, with respect to an autofocus fixing part including the magnet part, an autofocus movable part including the first coil part such that the autofocus movable part is movable in an optical-axis direction, the auto-focusing driving part being configured to perform automatic focusing by utilizing a driving force of a voice coil motor composed of the first coil part and the magnet part; and a shake-correcting driving part including: the magnet part to be disposed in the auto-focusing driving part; a second coil part to be disposed to be spaced apart in the optical-axis direction from the magnet part; and a second supporting member configured to support, with respect to a shake-correcting fixing part including the second coil part, a shake-correcting movable part including the magnet part such that the shake-correcting movable part is allowed to sway in an optical-axis-orthogonal plane, the shake-correcting driving part being configured to perform shake correction by utilizing a driving force of a voice coil motor composed of the second coil part and the magnet part. In the lens driving device, the magnet part is substantially rectangular in plan view and includes first magnets to be disposed respectively at two opposite sides of four sides of the magnet part and a second magnet to be disposed at another side of the four sides and a side positioned opposite the second magnet is a no-magnet-disposing part in which no magnet is disposed.

Advantageous Effects of Invention

According to the lens driving device according to the present invention, the magnetic interference with another adjacent lens driving device can be reduced.

BRIEF DESCRIPTION OF DRAWINGS

FIGS. 16A and 16B illustrate an example of configuration of a lens driving device according to Embodiment 4;

FIGS. 18A and 18B illustrate an example of configuration of a lens driving device according to Embodiment 6;

FIGS. 20A, 20B, and 20C illustrate an example of configuration of a lens driving device according to Embodiment 8.

DESCRIPTION OF EMBODIMENTS

Embodiment 1

Hereinafter, an example of configurations of lens driving device 1 and camera module A in which lens driving device 1 is mounted according to Embodiment 1 will be described with reference to FIGS. 1 to 13.

Figure 1A:
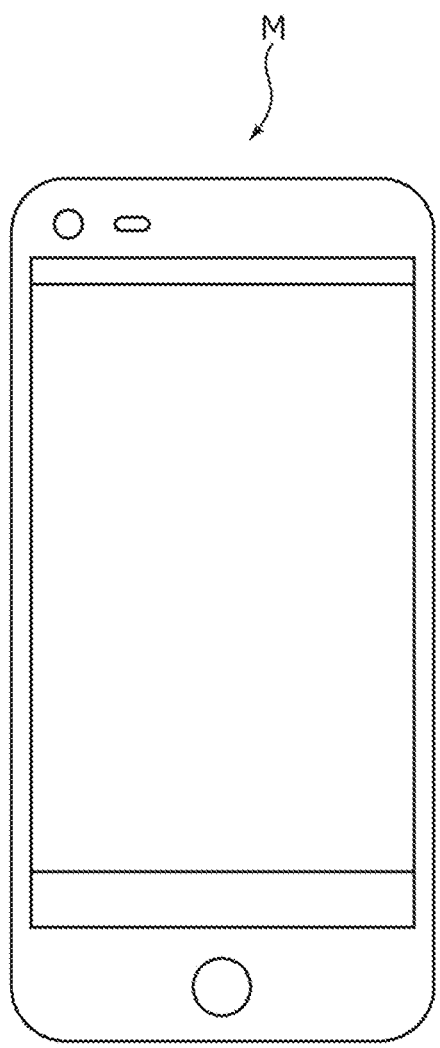
FIGS. 1A and 1B illustrate a smartphone in which a camera module according to Embodiment 1 is mounted.
Figure 1B:
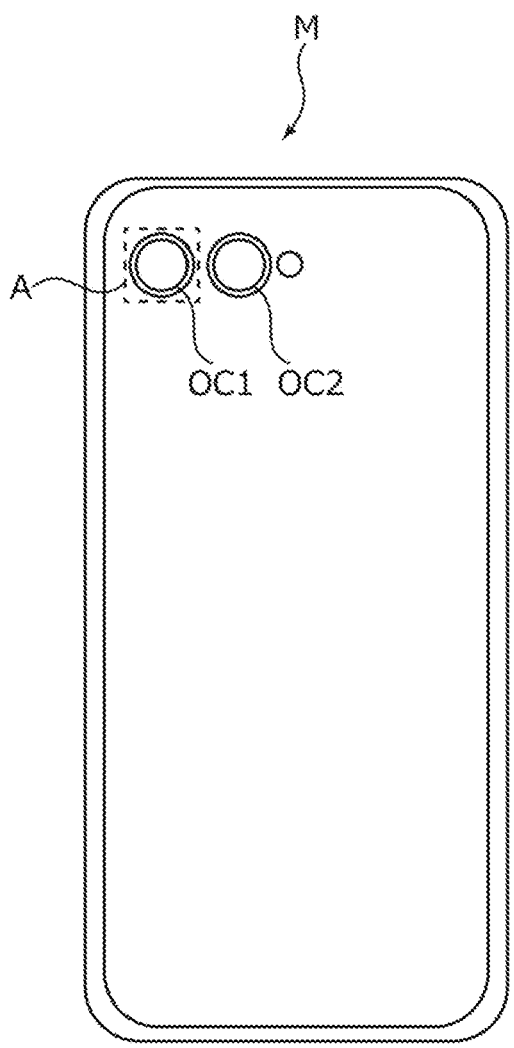

FIGS. 1A and 1B illustrate smartphone M in which camera module A according to the present embodiment is mounted. FIG. 1A is a front view of smartphone M and FIG. 1B is a rear view of smartphone M.

Smartphone M includes a dual camera consisting of two back side cameras OC1 and OC2 adjacent to each other. Camera module A according to the present embodiment is applied to at least one back side camera OC1 of the two back side cameras. Camera module A has the aforementioned AF and OIS functions.

Note that, the same configuration as in camera module A according to the present embodiment may be applied in the other back side camera OC2 like in back side camera OC1, or a different configuration including a voice coil motor may also be applied in back camera OC2.

Figure 2:
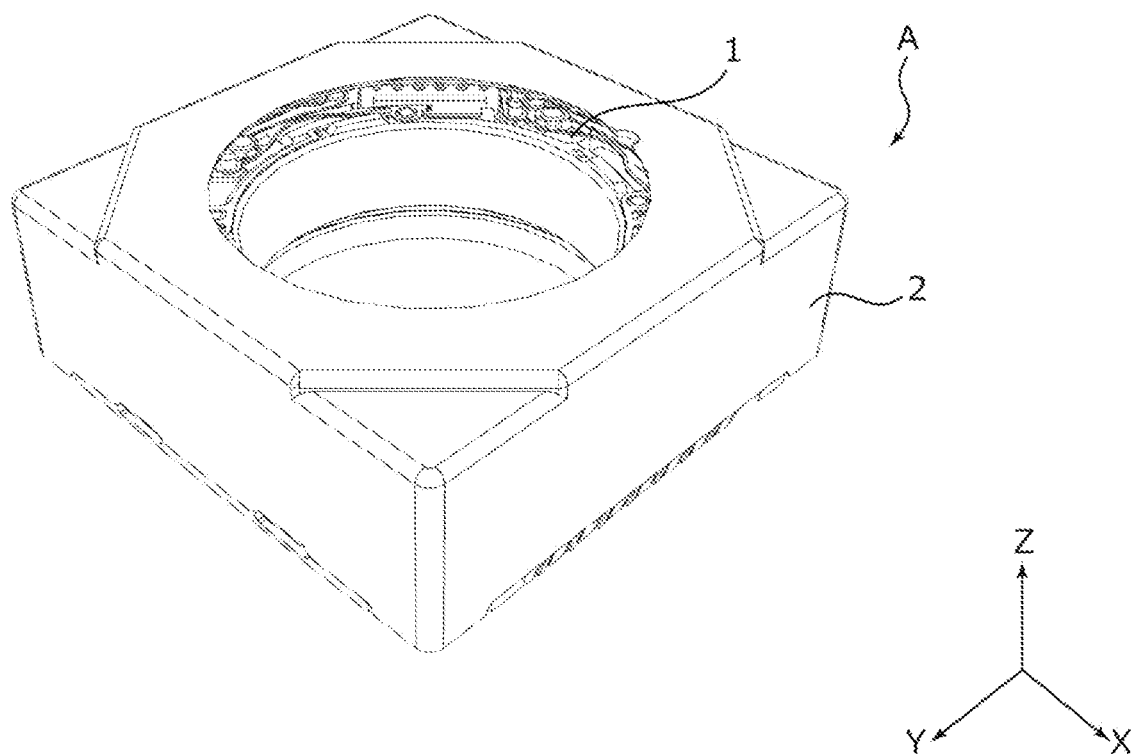
FIG. 2 is a perspective view of an external appearance of the camera module according to Embodiment 1.
Figure 3:
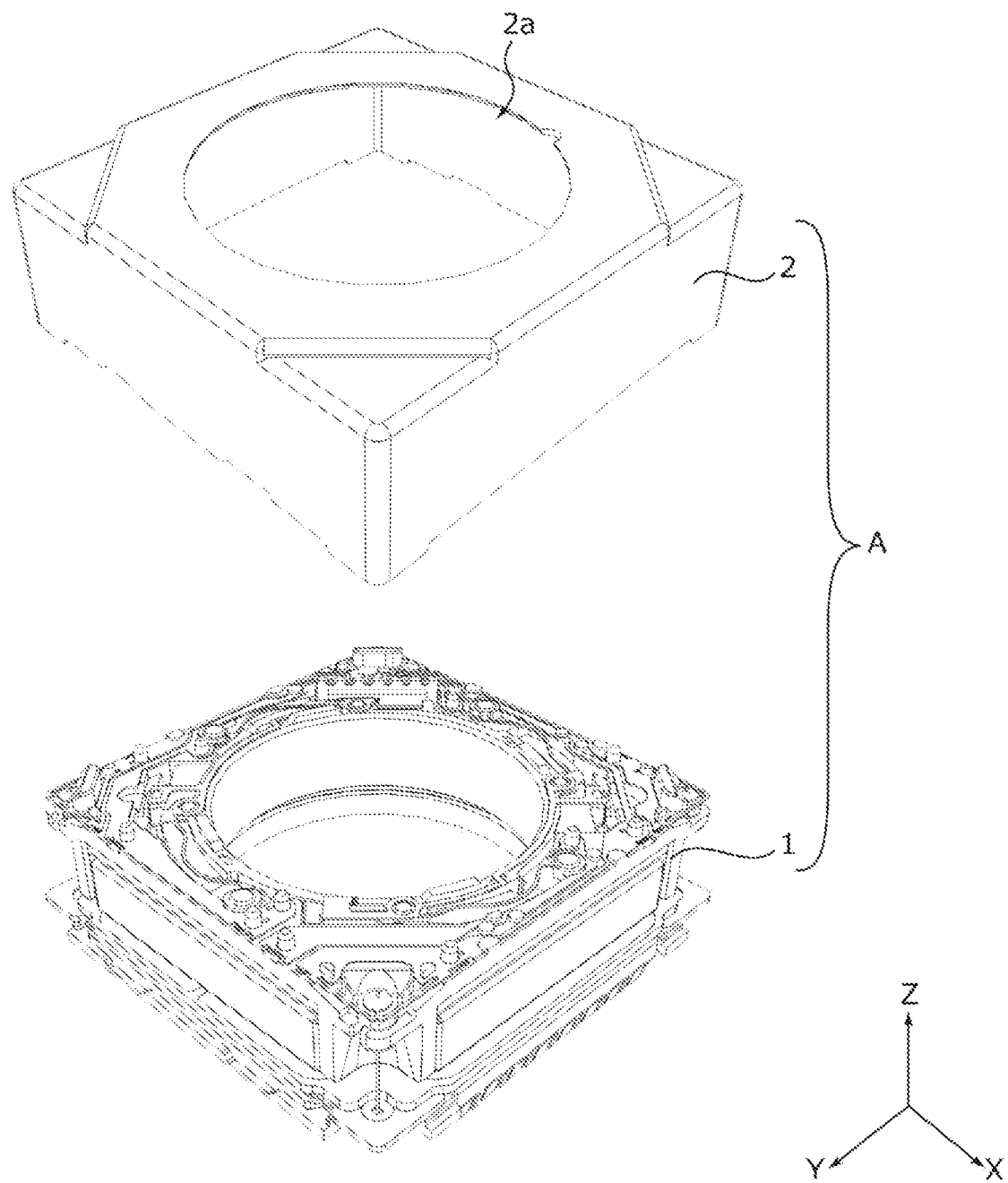
FIG. 3 is an exploded perspective view of the camera module according to Embodiment 1.
Figure 4:
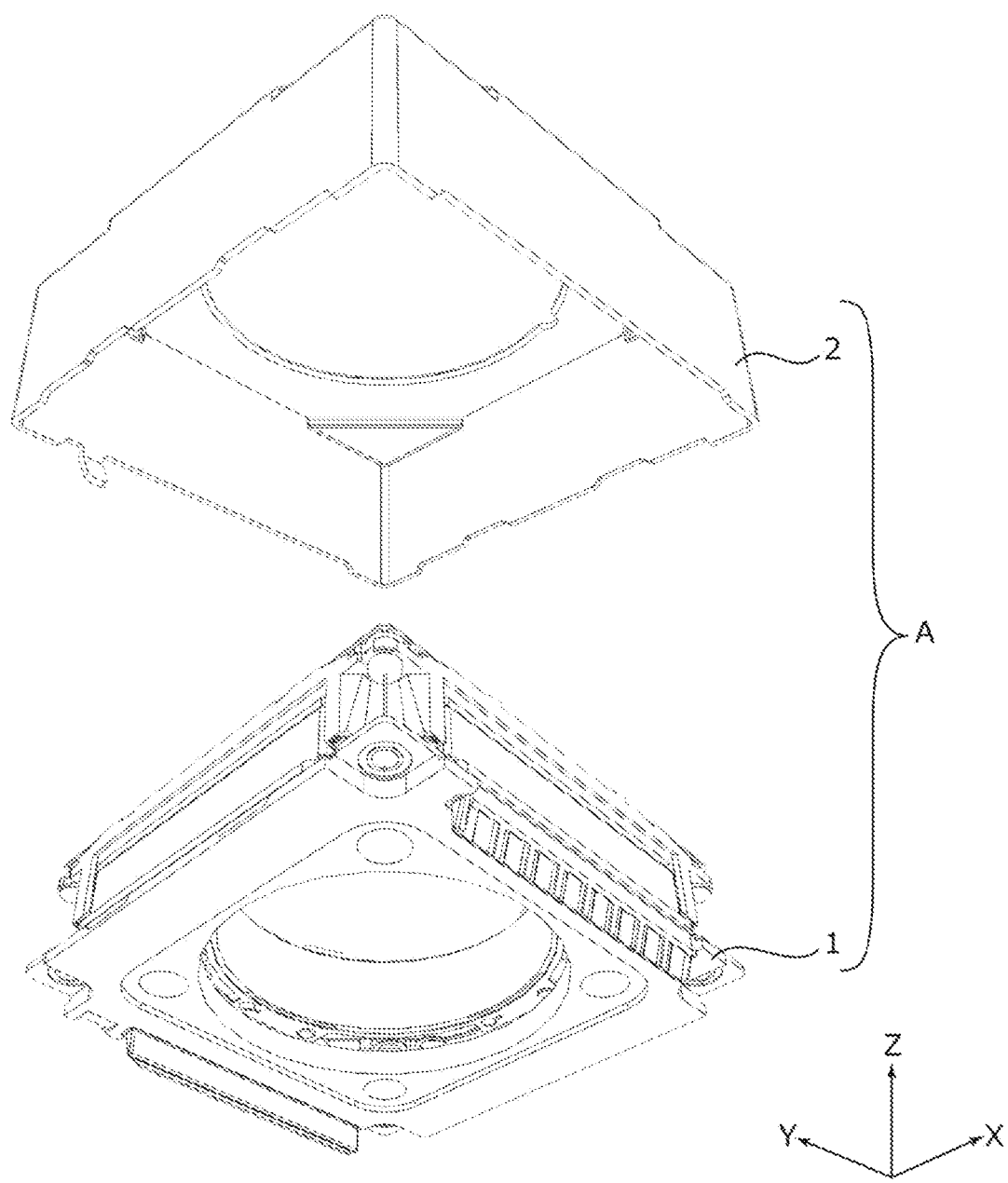
FIG. 4 is an exploded perspective view of the camera module according to Embodiment 1.

FIG. 2 is a perspective view of an external appearance of camera module A. FIGS. 3 and 4 are exploded perspective views of camera module A. FIG. 3 is an upper perspective view and FIG. 4 is a lower perspective view.

The embodiments will be described using an orthogonal coordinate system (X, Y, Z) as illustrated in FIGS. 2 to 4. The same orthogonal coordinate system (X, Y, Z) is also used for illustration of below-mentioned figures.

Camera module A is mounted such that the vertical direction (or horizontal direction) is the X-direction, the horizontal direction (or vertical direction) is the Y-direction, and the front-rear direction is the Z-direction during actually capturing an image with smartphone M. That is, the Z-direction is the optical axis direction, the upper sides in the figures are the light reception sides in the optical axis direction (also referred to as "macro position sides"), and the lower sides are the image formation sides in the optical axis direction (also referred to as "infinity position sides"). In addition, the X- and Y-directions orthogonal to the Z-axis are referred to as "optical-axis-orthogonal directions."

Camera module A includes lens driving device 1 that achieves the AF function and the OIS function, a lens part (not illustrated) composed of a cylindrical lens barrel and a lens housed therein, an image capturing part (not illustrated) configured to capture a subject image imaged by the lens part, cover 2 entirely covering camera module A, and the like.

Cover 2 is a capped rectangular cylindrical member having a square shape in plan view as seen in the optical-axis direction, and has circular opening 2a in its top surface. The lens part (not illustrated) faces outside from this opening 2a. Cover 2 is fixed to base 21 (see FIGS. 11 and 12) of OIS fixing part 20 of lens driving device 1.

The image capturing part (not illustrated) includes an imaging device (not illustrated), and is disposed on the image formation side of lens driving device 1 in the optical-axis direction. The imaging device (not illustrated) is composed of, for example, a charge-coupled device (CCD) image sensor, a complementary metal oxide semiconductor (CMOS) image sensor, or the like. The imaging device (not illustrated) captures a subject image imaged by the lens part (not illustrated).

Figure 5:
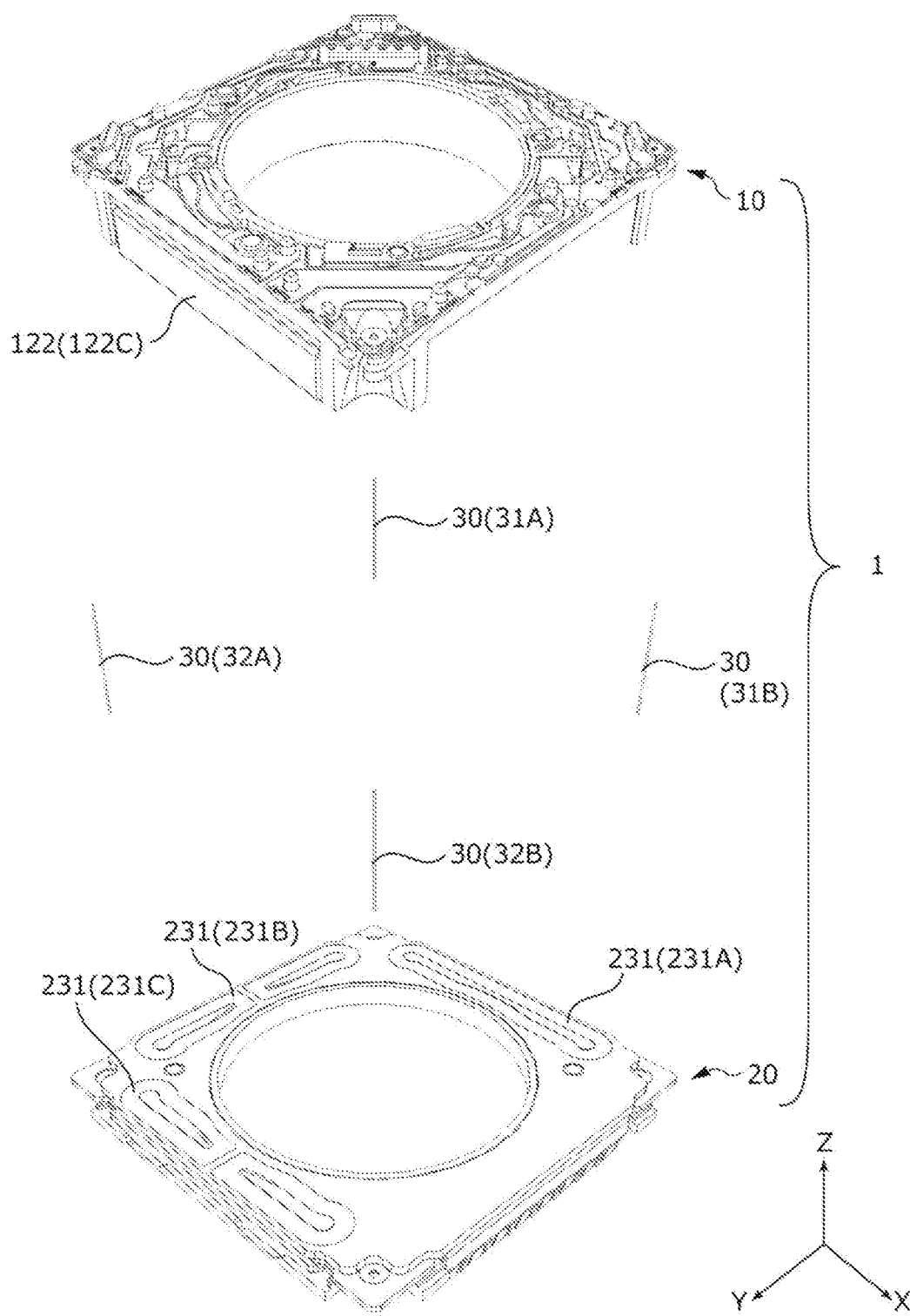
FIG. 5 is an exploded perspective view of a lens driving device according to Embodiment 1.
Figure 6:
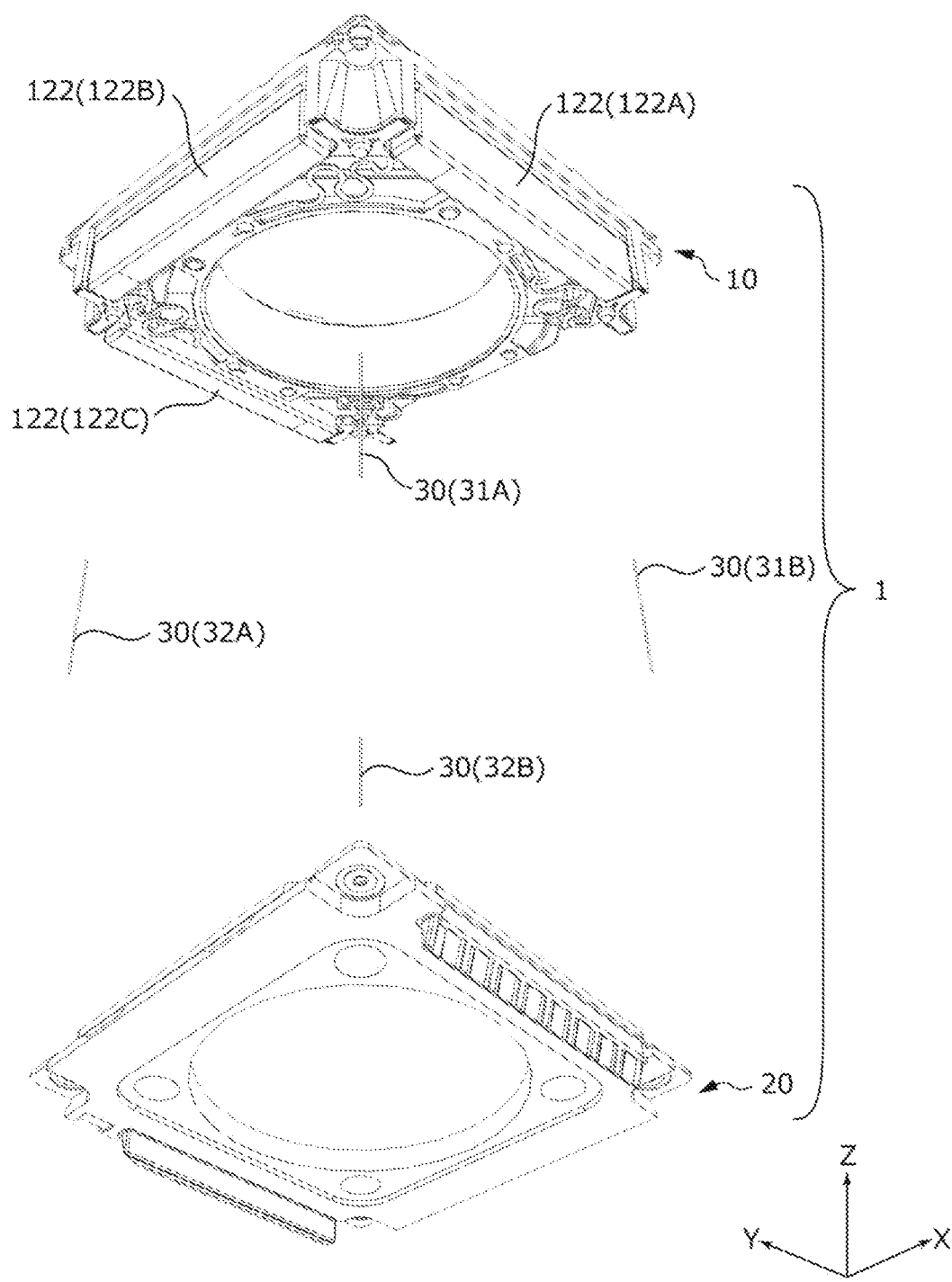
FIG. 6 is an exploded perspective view of the lens driving device according to Embodiment 1.

FIGS. 5 and 6 are exploded perspective views of lens driving device 1. FIG. 5 is an upper perspective view and FIG. 6 is a lower perspective view. As illustrated in FIGS. 5 and 6, lens driving device 1 includes OIS movable part 10, OIS fixing part 20, OIS supporting member 30, and the like.

OIS movable part 10 includes an OIS magnet part being a component of an OIS voice coil motor, and sways in the XY plane during shake correction. OIS fixing part 20 includes OIS coil part 231 being a component of the OIS voice coil motor, and supports OIS movable part 10 via OIS supporting member 30. That is, the moving-magnet system is employed in the OIS driving part of lens driving device 1. OIS movable part 10 includes an AF driving part (AF movable part 11 and AF fixing part 12 (see FIGS. 7 and 8)).

OIS movable part 10 is disposed to be spaced apart from OIS fixing part 20 on the light reception side in the optical-axis direction, and is coupled to OIS fixing part 20 by OIS supporting member 30. Specifically, OIS supporting member 30 is composed of four suspension wires (hereinafter referred to as "suspension wires 30") extending in the Z-direction. One ends (upper ends) of suspension wires 30 are fixed to OIS movable part 10 (to upper elastic supporting member 13 (see FIGS. 7 and 8)), and the other ends (lower ends) are fixed to OIS fixing part 20 (to coil board 23 (see FIGS. 11 and 12)). OIS movable part 10 is supported to be able to sway in the XY plane by suspension wires 30.

In the present embodiment, suspension wires 31A and 31B among four suspension wires 30 are used as a signal path for conveying control signals to control IC 161 (see FIG. 9)), and suspension wires 32A and 32B among four suspension wires 30 are used as a power-supplying path to control IC 161 (suspension wires 31A and 31B may also hereinafter be referred to as "signal suspension wires 31A and 31B" and suspension wires 32A and 32B may also hereinafter be referred to as "power-supplying suspension wires 32A and 32B").

Figure 7:
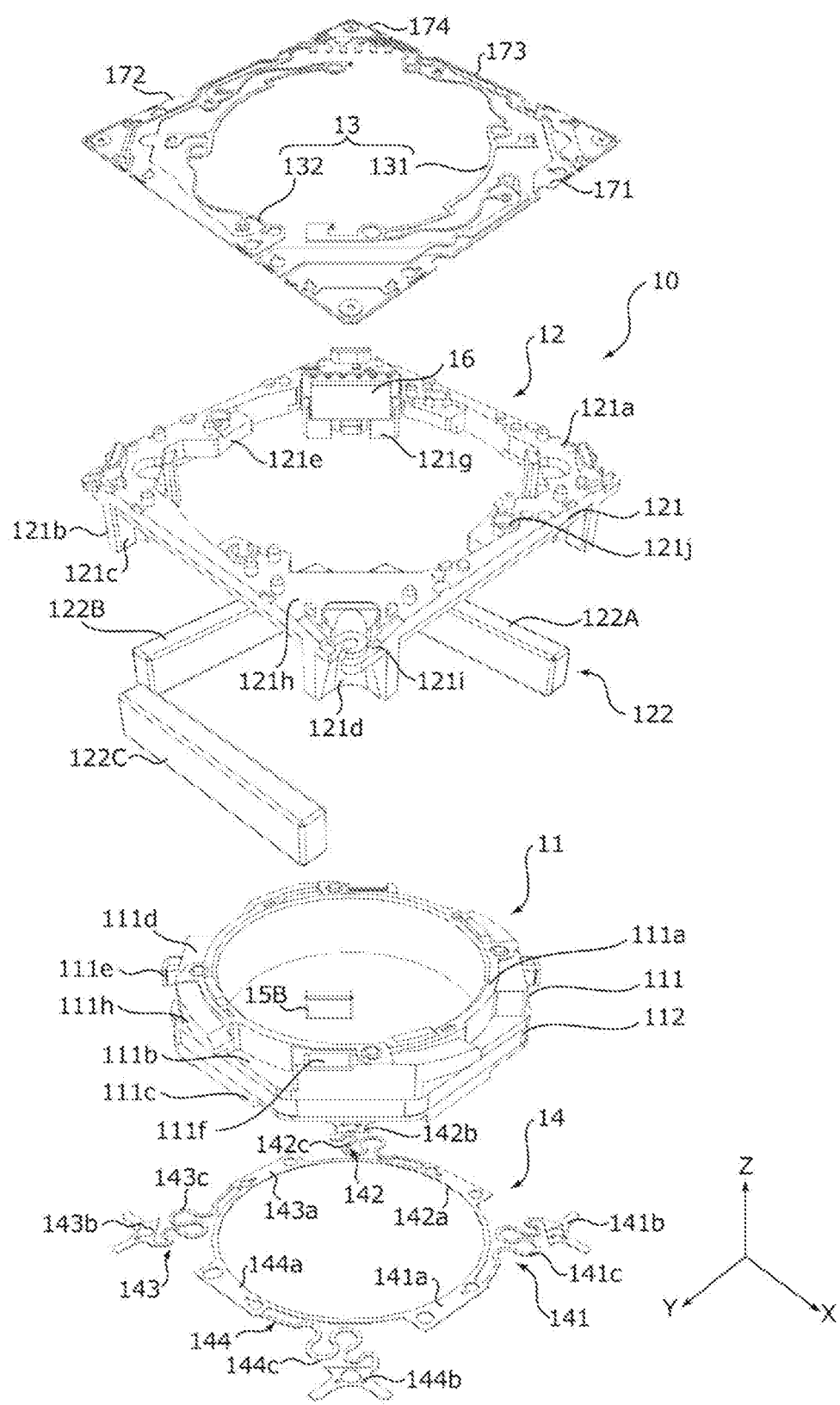
FIG. 7 is an exploded perspective view of an OIS movable part of the lens driving device according to Embodiment 1.
Figure 8:
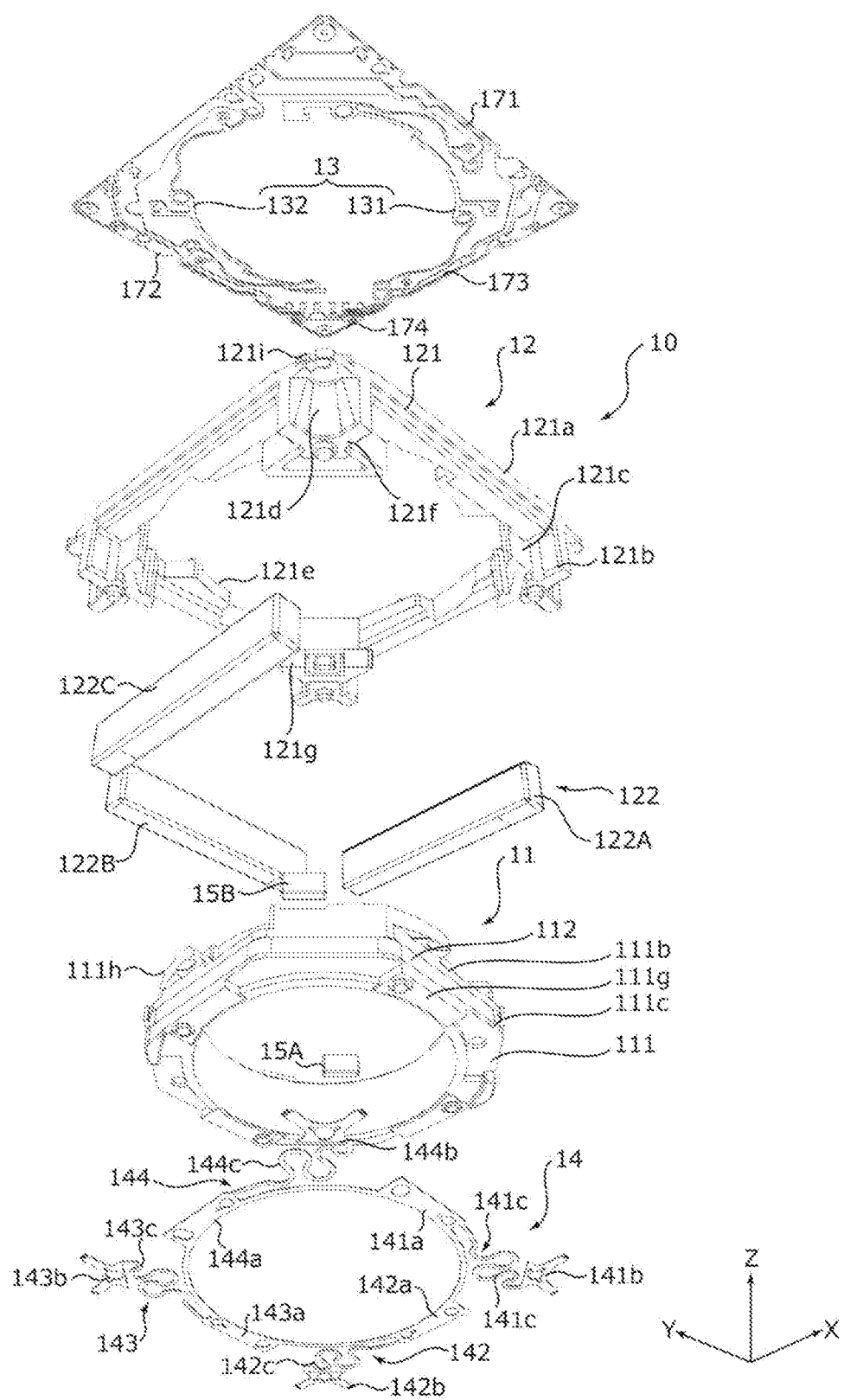
FIG. 8 is an exploded perspective view of the OIS movable part of the lens driving device according to Embodiment 1.

FIGS. 7 and 8 are exploded perspective views of OIS movable part 10. FIG. 7 is an upper perspective view and FIG. 8 is a lower perspective view.

As illustrated in FIGS. 7 and 8, OIS movable part 10 includes AF movable part 11, AF fixing part 12, AF supporting members 13 and 14, AF power-supply lines 171, signal lines 172 and 174, and the like.

AF movable part 11 includes AF coil part 112 being a component of the AF voice coil motor, and moves in the optical-axis direction during focusing. AF fixing part 12 includes magnet part 122 (AF magnet part), and supports AF movable part 11 via AF supporting members 13 and 14. That is, the moving-coil system is employed in the AF driving part of lens driving device 1.

AF movable part 11 is disposed to be radially inwardly spaced apart from AF fixing part 12, and is coupled to AF fixing part 12 by AF supporting members 13 and 14. AF supporting member 13 is an upper elastic supporting member which supports AF movable part 11 with respect to AF fixing part 12 at their upper side (AF supporting member 13 may also hereinafter be referred to as "upper elastic supporting member 13"), and AF supporting member 14 is a lower elastic supporting member which supports AF movable part 11 with respect to AF fixing part 12 at their lower side (AF supporting member 14 may also hereinafter be referred to as "lower elastic supporting member 14").

AF movable part 11 includes lens holder 111, AF coil part 112, and position-detecting magnets 15A and 15B.

Lens holder 111 includes cylindrical lens housing 111a and flange portions 111b and 111c. Flange portions 111b and 111c protrude radially outward from lens housing 111a and each have a substantially octagonal shape in plan view. AF coil part 112 is wound on a portion sandwiched between flange portions 111b and 111c (this portion may also hereinafter be referred to as "coil winding portion"). The upper surface of flange portion 111b serves as a locking portion for restricting the movement of AF movable part 11 toward the light reception side in the optical-axis direction.

Lens holder 111 includes four upper-spring fixing portions 111d used for fixing upper elastic supporting member 13 at four portions of the upper outer periphery of lens housing 111a where lens housing 111a crosses the directions rotated by 45 degrees from the X- and Y-directions (the X- and Y-directions may hereinafter be referred to as "cross directions") (the directions rotated may hereinafter be referred to as "diagonal directions"). Lens holder 111 includes first stopper portions 111h along the outer periphery of lens housing 111a. The undersurfaces of first stopper portions 111h serve as locking portions for restricting the movement of AF movable part 11 toward the image formation side in the optical-axis direction.

Lens holder 111 includes tying parts 111e radially outwardly protruding from two diagonally-positioned upper-spring fixing portions 111d of four upper-spring fixing portions 111d. Lens holder 111 includes magnet housings 111f adapted to house position-detecting magnets 15A and 15B in the other two of upper-spring fixing portions 111d to which tying parts 111e are not disposed. Lens holder 111 also includes lower-spring fixing portions 111g for fixing lower elastic supporting member 14 at four portions of the undersurface of flange portion 111c where flange portion 111c crosses the cross directions.

AF coil part 112 is an air core coil to be energized at the time of focusing, and is wound on the outer peripheral surface of coil winding portion of lens holder 111. The both ends of AF coil part 112 are tied to tying parts 111e of lens holder 111. The energization current through AF coil part 112 is controlled by control IC 161 (see FIG. 9).

Position-detecting magnets 15A and 15B are disposed in magnet housings 111f of lens holder 111. Position-detecting magnet 15A (hereinafter referred to as "first position-detecting magnet 15A") disposed on the side corresponding to an AF control part is actually used for position detection of AF movable part 11. The other position-detecting magnet 15B (hereinafter referred to as "second position-detecting magnet 15B") is a dummy magnet which is not used for position detection of AF movable part 11. Second position-detecting magnet 15B is disposed in order to balance the magnetic forces which act on AF movable part 11 and to stabilize the attitude of AF movable part 11. In other words, if second position-detecting magnet 15B is not disposed, an unbalanced magnetic force caused by the magnetic field generated by magnet part 122 acts on AF movable part 11, so as to make the attitude of AF movable part 11 unstable; in order to prevent this, second position-detecting magnet 15B is disposed.

AF fixing part 12 includes magnet holder 121, magnet part 122, and AF control part 16.

Magnet holder 121 includes square upper frame 121a and legs 121b. Legs 121b are vertically provided at the four corners of upper frame 121a. Four legs 121b include magnet holding portions 121c, respectively. Magnet holding portions 121c hold magnet part 122 along the four sides of upper frame 121a. Legs 121b also includes wire insertion portions 121d, respectively. Wire insertion portions 121d are each depressed radially inward into the shape of a circular arc. Suspension wires 30 are disposed in wire insertion portions 121d (see FIGS. 5 and 6). Interference between suspension wires 30 and magnet holder 121 during sway of OIS movable part 10 can be avoided by providing wire insertion portions 121d.

Magnet holder 121 includes at its upper portions second stopper portions 121e projecting radially inward from magnet holder 121. Magnet holder 121 includes an opening formed by cutting out portions corresponding to lens housing 111a, upper-spring fixing portions 111d, tying parts 111e, and first stopper portions 111h of lens holder 111. AF movable part 11 can move on the light reception side in the optical-axis direction beyond the upper surface of magnet holder 121. When AF movable part 11 moves toward the light reception side in the optical-axis direction, second stopper portions 121e come into contact with flange portion 111b of lens holder 111, so as to restrict the movement of AF movable part 11 toward the light reception side in the optical-axis direction.

Additionally, arm portions 131c, 131f, 132c, and 132f (see FIG. 10) of upper elastic supporting member 13 are placed on the upper surfaces of second stopper portions 121e. Damper housings 121j are disposed at second stopper portions 121e.

Magnet holder 121 includes, at the undersurfaces of legs 121b, lower-spring fixing portions 121f for fixing lower elastic supporting member 14. Magnet holder 121 includes, at the four corners of its upper portion, upper-spring fixing portions 121h for fixing upper elastic supporting member 13.

Corner portions 121i of upper-spring fixing portions 121f are each formed to be downwardly depressed further below the upper surface of magnet holder 121 (the surface to which upper elastic supporting member 13 is attached) and are each formed such that a gap is formed between the corner portion and upper elastic supporting member 13 after attachment of upper elastic supporting member 13 (corner portions 121i may be referred to as "damper disposing portions 121i"). The apical-angle portions of damper disposing portions 121i extend outward and are circularly cut. Those portions of damper disposing portions 121i which are circularly cut communicate with wire insertion portions 121d.

Magnet holder 121 also includes IC housing 121g for housing AF control part 16 in one of legs 121b.

Magnet part 122 includes three magnets 122A to 122C each having the shape of a rectangular parallelepiped. Magnets 122A to 122C are adhesively fixed to magnet holding portions 121c of magnet holder 121. Magnets 122A to 122C are magnetized such that magnetic fields radially crossing AF coil part 112 are formed at AF coil 112. For example, magnets 122A to 122C are permanent magnets magnetized such that the inner periphery sides and the outer periphery sides of magnets 122A to 122C are set to N poles and S poles, respectively.

Magnet part 122 and coil part 112 constitute the AF voice coil motor. In the present invention, magnet part 122 serves as both of the AF magnet part and the OIS magnet part.

Figure 9:
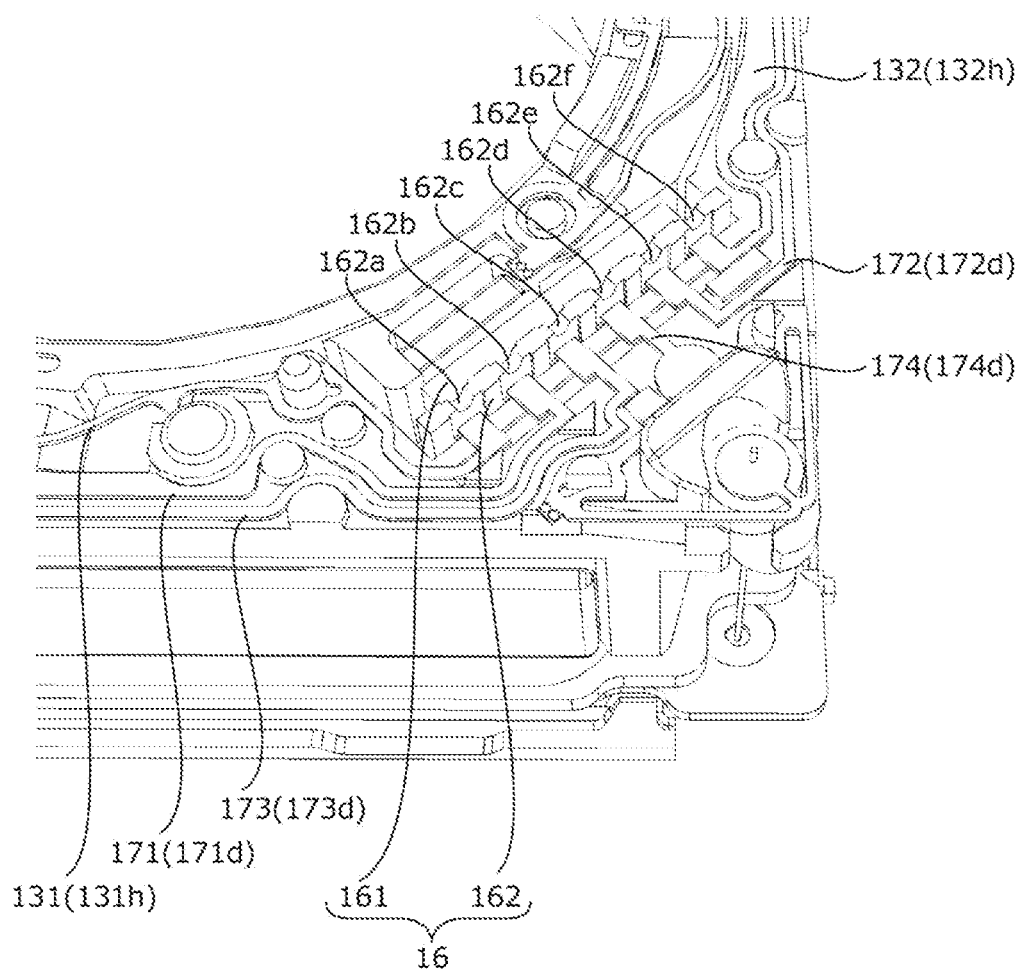
FIG. 9 is an enlarged view illustrating a configuration of an AF control part of the lens driving device according to Embodiment 1.

FIG. 9 is an enlarged view illustrating the configuration of AF control part 16. AF control part 16 is disposed in IC housing 121g of magnet holder 121.

AF control part 16 includes control IC 161, AF circuit board 162 on which control IC 161 is mounted, and a capacitor (whose reference numeral is omitted).

Control IC 161 includes a built-in Hall element (not illustrated) that utilizes the Hall effect to detect the change in magnetic field, and functions as a Z-position detecting part. Control IC 161 is disposed so that the detecting direction of the Hall element (not illustrated) is the same as the optical-axis direction. Control IC 161 mainly detects the change in magnetic field produced by first position-detecting magnet 15A. In this way, the position of AF movable part 11 in the optical-axis direction is detected.

Control IC 161 also includes a coil control part (not illustrated) that controls the energization current through AF coil part 112. Control IC 161 is electrically connected to AF coil part 112, and controls the energization current through AF coil part 112 based on the control signals provided via signal suspension wires 31A and 31B and signal lines 173 and 174 and based on the detection result of the Hall element.

AF circuit board 162 includes power-supply output terminals 162a and 162f, power-supply input terminals 162b and 162e, and signal input terminals 162c and 162d. Power-supply output terminals 162a and 162f are connected to upper elastic supporting member 13 (upper plate springs 131 and 132), power-supply input terminals 162b and 162e are connected to AF power-supply lines 171 and 172, and signal input terminals 162c and 162d are connected to signal lines 173 and 174.

AF circuit board 162 includes power-supply output terminals 162a and 162f, power-supply input terminals 162b and 162e, and signal input terminals 162c and 162d. Power-supply output terminals 162a and 162f are connected to upper elastic supporting member 13 (upper plate springs 131 and 132), power-supply input terminals 162b and 162e are connected to AF power-supply lines 171 and 172, and signal input terminals 162c and 162d are connected to signal lines 173 and 174.

Upper elastic supporting member 13, AF power-supply lines 171 and 172, and signal lines 173 and 174 are formed, for example, from beryllium copper, nickel copper, stainless steel, and/or the like.

Figure 10A:
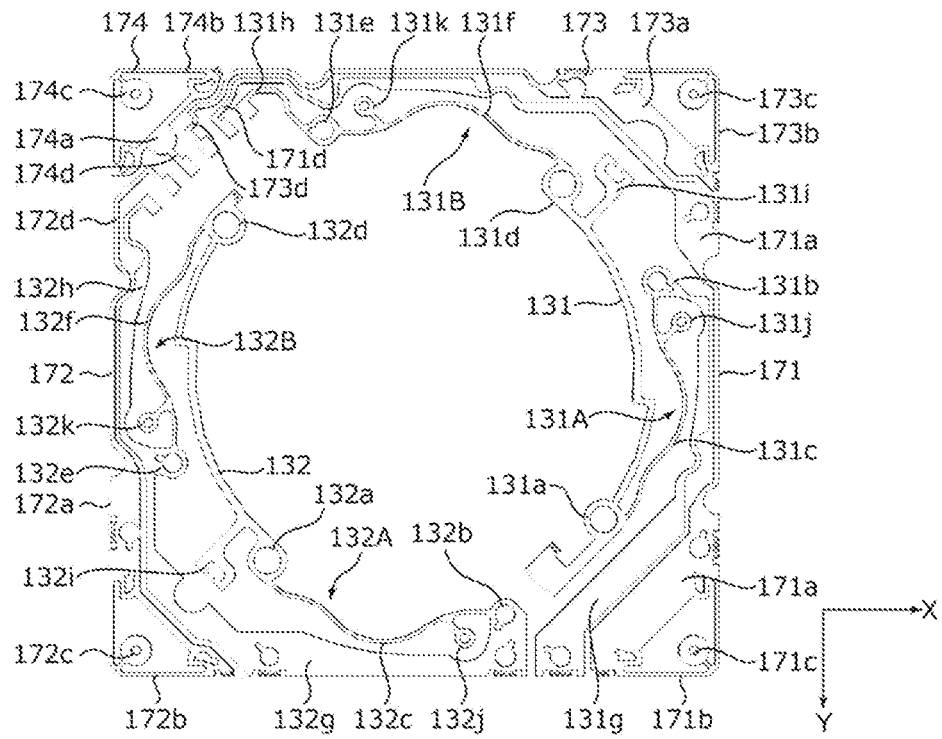
FIGS. 10A and 10B are plan views of an upper elastic supporting member of the lens driving device according to Embodiment 1.
Figure 10B:
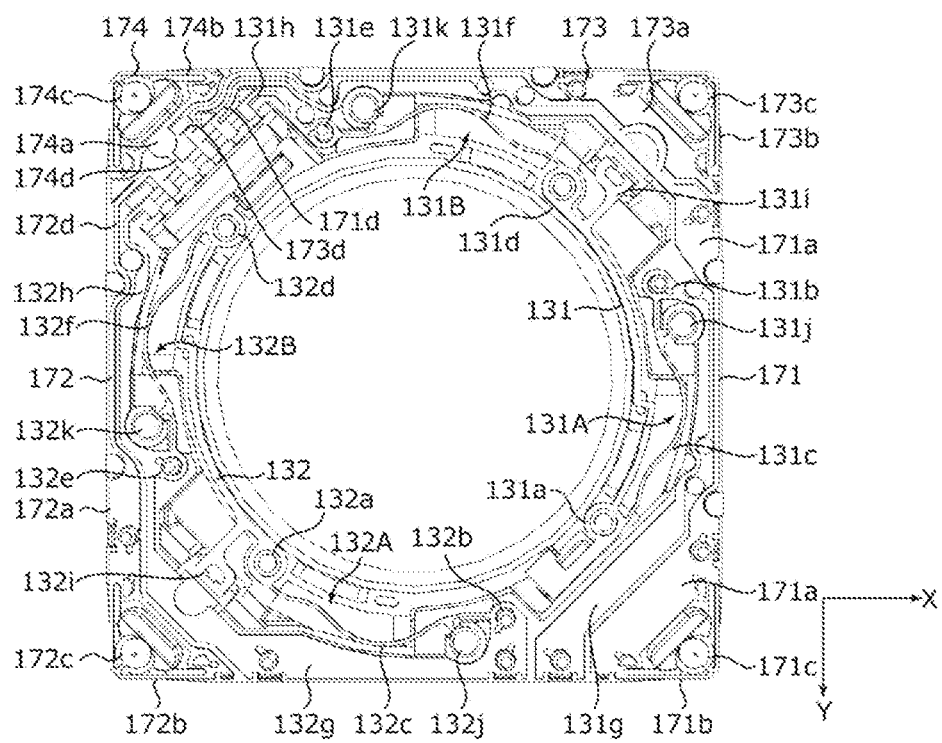

FIGS. 10A and 10B are plan views illustrating the configuration of upper elastic supporting member 13, AF power-supply lines 171 and 172, signal lines 173 and 174. FIG. 10A illustrates the state before upper elastic supporting member 13, AF power-supply lines 171 and 172, and signal lines 173 and 174 are attached to AF movable part 11 and AF fixing part 12, and FIG. 10B illustrates the state after upper elastic supporting member 13, AF power-supply lines 171 and 172, and signal lines 173 and 174 are attached to AF movable part 11 and AF fixing part 12.

As illustrated in FIGS. 10A and 10B, upper elastic supporting member 13, AF power-supply lines 171 and 172, and signal lines 173 and 174, as a whole, are square in plan view, that is, have a shape similar to the shape of upper frame 121a of magnet holder 121. Upper elastic supporting member 13, AF power-supply lines 171 and 172, and signal lines 173 and 174 are routed on or above upper frame 121a in such a manner as not to be in contact with one another. Upper elastic supporting member 13 is disposed inside AF power-supply lines 171 and 172 and signal lines 173 and 174 for coupling magnet holder 121 and lens holder 111 together. Upper plate springs 131 and 132 and AF power-supply lines 171 and 172, and signal lines 173 and 174 are formed by etching one sheet metal, for example.

Upper elastic supporting member 13 includes upper plate springs 131 and 132 adapted to elastically support AF movable part 11 with respect to AF fixing part 12. Upper plate springs 131 and 132 function as coil power-supply lines for supplying electricity to AF coil part 112. AF power-supply lines 171 and 172 are connected to power-supplying suspension wires 32B and 32A, and supply electricity to AF control part 16 (control IC 161). Signal lines 173 and 174 are connected to signal suspension wires 31B and 31A, and provide the control signals to AF control part 16 (control IC 161).

Upper plate spring 131 includes two spring portions 131A and 131B. Spring portion 131A includes lens-holder fixing portion 131a to be fixed to lens holder 111, magnet-holder fixing portion 131b to be fixed to magnet holder 121, and arm portion 131c coupling lens-holder fixing portion 131a and magnet-holder fixing portion 131b together. Similarly, spring portion 131B includes lens-holder fixing portion 131d, magnet-holder fixing portion 131e, and arm portion 131f. Lens-holder fixing portions 131a and 131d are coupled to each other along lens housing 111a of lens holder 111.

Upper plate spring 131 is positioned with respect to lens holder 111 and fixed thereto by fitting positioning bosses (whose reference numerals are omitted) of upper-spring fixing portions 111d of lens holder 111 in fixing holes (whose reference numerals are omitted) of lens-holder fixing portions 131a and 131d. Upper plate spring 131 is also positioned with respect to magnet holder 121 and fixed thereto by fitting positioning bosses (whose reference numerals are omitted) of upper-spring fixing portions 121e of magnet holder 121 in fixing holes (whose reference numerals are omitted) of magnet-holder fixing portions 131b and 131e.

Arm portions 131c and 131f each have a curved shape, and elastically deform when AF movable part 11 moves. Upper plate spring 131 includes damper fixing portions 131j and 131k diverging and extending from arm portions 131c and 131f, respectively. Damper fixing portions 131j and 131k are to be disposed in damper housings 121j of magnet holder 121, and are to be embedded therein by the damper material.

Upper plate spring 131 includes supplementary fixing portion 131g extending from magnet-holder fixing portion 131b toward one of the peripheral edges extending along the X-direction. Supplementary fixing portion 131g is disposed on the upper surface of magnet holder 121, and reinforces the fixation state of upper plate spring 131 to magnet holder 121.

Upper plate spring 131 includes terminal connection portion 131h extending from magnet-holder fixing portion 131e toward AF circuit board 162. Terminal connection portion 131h is connected to power-supply output terminal 162a of AF control part 16. Upper plate spring 131 includes coil connection portion 131i diverging and extending from the coupling portion of lens-holder fixing portions 131a and 131d. The end of coil connection portion 131i is U-shaped. Coil connection portion 131i is connected to one end of AF coil part 112 by soldering. That is, AF control part 16 and AF coil part 112 are electrically connected to each other via upper plate spring 131.

Upper plate spring 132 has the same basic structure as upper plate spring 131. That is, upper plate spring 132 includes two spring portions 132A and 132B. Spring portions 132A and 132B include lens-holder fixing portions 132a and 132d, magnet-holder fixing portions 132b and 132e, and arm portions 132c and 132f. Lens-holder fixing portions 132a and 132d are coupled to each other along lens housing 111a of lens holder 111.

Upper plate spring 132 is positioned with respect to lens holder 111 and fixed thereto by fitting positioning bosses (whose reference numerals are omitted) of upper-spring fixing portions 111d of lens holder 111 in fixing holes (whose reference numerals are omitted) of lens-holder fixing portions 132a and 132d. Upper plate spring 132 is also positioned with respect to magnet holder 121 and fixed thereto by fitting positioning bosses (whose reference numerals are omitted) of upper-spring fixing portions 121e of magnet holder 121 in fixing holes (whose reference numerals are omitted) of magnet-holder fixing portions 132b and 132e.

Arm portions 132c and 132f each have a curved shape, and elastically deform when AF movable part 11 moves. Upper plate spring 132 includes damper fixing portions 132j and 132k diverging and extending from arm portions 132c and 132f, respectively. Damper fixing portions 132j and 132k are to be disposed in damper housings 121j of magnet holder 121, and are to be embedded therein by the damper material.

Upper plate spring 132 includes supplementary fixing portion 132g extending from magnet-holder fixing portion 132b toward magnet-holder fixing portion 132e while forming one of the peripheral edges extending along the X-direction. Supplementary fixing portion 132g is disposed on the upper surface of magnet holder 121, and reinforces the fixation state of upper plate spring 132 to magnet holder 121.

Upper plate spring 132 includes terminal connection portion 132h extending from magnet-holder fixing portion 132e toward AF circuit board 162. Terminal connection portion 132h is connected to power-supply output terminal 162f of AF control part 16. Upper plate spring 132 includes coil connection portion 132i diverging and extending from the coupling portion of lens-holder fixing portions 132a and 132d. The end of coil connection portion 132i is U-shaped. Coil connection portion 132i is connected to the other end of AF coil part 112 by soldering. That is, AF control part 16 and AF coil part 112 are electrically connected to each other via upper plate spring 132.

AF power-supply lines 171 and 172 include magnet-holder fixing portions 171a and 172a, wire connection portions 171c and 172c, and terminal connection portions 171d and 172d.

AF power-supply lines 171 and 172 are positioned with respect to magnet holder 121 and fixed thereto by fitting positioning bosses (whose reference numerals are omitted) of upper-spring fixing portions 121h of magnet holder 121 in fixing holes (whose reference numerals are omitted) of magnet-holder fixing portions 171a and 172a.

Wire connection portions 171c and 172c are connected to power-supplying suspension wires 32A and 32B (see FIGS. 5 and 6). Wire connection portions 171c and 172c are coupled to magnet-holder fixing portion 171a by link portions 171b and 172b. Terminal connection portions 171d and 172d extend from magnet-holder fixing portions 171a and 172a toward AF circuit board 162, and are connected to power-supply input terminals 162b and 162e of AF control part 16.

Signal lines 173 and 174 include magnet-holder fixing portions 173a and 174a, wire connection portions 173c and 174c, and terminal connection portions 173d and 174d.

Signal lines 173 and 174 are positioned with respect to magnet holder 121 and fixed thereto by fitting positioning bosses (whose reference numerals are omitted) of upper-spring fixing portions 121h of magnet holder 121 in fixing holes (whose reference numerals are omitted) of magnet-holder fixing portion 173a.

Wire connection portions 173c and 174c are connected to signal suspension wires 31A and 31B (see FIGS. 5 and 6). Wire connection portions 173c and 174c are coupled to magnet-holder fixing portions 173a and 174a by link portions 173b and 174b. Terminal connection portions 173d and 174d extend from magnet-holder fixing portions 173a and 174a toward AF circuit board 162, and are connected to signal input terminals 162c and 162d of AF control part 16.

In AF power-supply lines 171 and 172 and signal lines 173 and 174, link portions 171b, 172b, 173b, and 174b each include two first links (whose reference numeral is omitted) extending from each of magnet-holder fixing portions 171a, 172a, 173a, and 174a toward the corner, and a second link (whose reference numeral is omitted) inwardly bent from the confluent portion of the two first links. Wire connection portions 171c, 172c, 173c, and 174c are disposed at the ends of the second links, respectively. That is, link portions 171b, 172b, 173b, and 174b interposed between magnet-holder fixing portions 171a, 172a, 173a, and 174a and wire connection portions 171c, 172c, 173c, and 174c are multi-articulated while securing the linkage length.

With this configuration, stresses caused in link portions 171b, 172b, 173b, and 174b during shake correction are mitigated, so that the tilt characteristics improve and also the resistance to impact such as drop impact or the like improves.

Damper fixing portions 131j, 131k, 132j, and 132k of upper plate springs 131 and 132 of upper elastic supporting member 13 are disposed in damper housings 121j of magnet holder 121, and are embedded therein by the damper material. Additionally, gaps are formed respectively between wire connection portions 171c, 172c, 173c, and 174c of AF power-supply lines 171 and 172 and signal lines 173 and 174, on the one hand, and damper disposing portions 121i of magnet holder 121, on the other hand, and the damper material is disposed in these gaps to surround suspension wires 30. The damper material is consequently interposed between upper elastic supporting member 13 and magnet holder 121.

By interposing the damper material (not illustrated) between upper elastic supporting member 13 and magnet holder 121, occurrence of unwanted resonance (high-order resonant mode) is reduced, so that operational stability can be ensured. The damper material can be easily applied using a dispenser. For example, an ultraviolet-curable silicone gel is applicable as the damper material.

As with upper elastic supporting member 13, lower elastic supporting member 14 is a plate spring formed, for example, from beryllium copper, nickel copper, stainless steel, and/or the like (lower elastic supporting member 14 may hereinafter be referred to as "lower plate spring 14"), and is square as a whole in plan view. Lower plate spring 14 elastically connects AF fixing part 12 (magnet holder 121) to AF movable part 11 (lens holder 111). Lower plate spring 14 is shaped by etching.

Lower plate spring 14 (lower elastic supporting member) includes four spring portions 141 to 144. Spring portion 141 includes: lens-holder fixing portion 141a to be fixed to lens holder 111; magnet-holder fixing portion 141b that is disposed at a position rotated 90 degrees from lens-holder fixing portion 141a and that is to be fixed to magnet holder 121; and arm portion 141c coupling lens-holder fixing portion 141a and magnet-holder fixing portion 141b together. Spring portions 142 to 144 also include the same configuration.

As for lens-holder fixing portions 141a to 144a, adjacent lens-holder fixing portions are coupled to one another and lens-holder fixing portions 141a to 144a as a whole have a shape corresponding to lower-spring fixing portion 111g of lens holder 111. Lower plate spring 14 is positioned with respect to lens holder 111 and fixed thereto by fitting positioning bosses (whose reference numerals are omitted) of lower-spring fixing portions 111g of lens holder 111 in fixing holes (whose reference numerals are omitted) of lens-holder fixing portions 141a to 144a.

Magnet-holder fixing portions 141b to 144b have shapes corresponding to lower-spring fixing portions 121f of magnet holder 121, respectively. Lower plate spring 14 is positioned with respect to magnet holder 121 and fixed thereto by fitting positioning bosses of lower-spring fixing portions 121f in fixing holes of magnet-holder fixing portions 141b to 144b.

In OIS movable part 10, AF control part 16, upper elastic supporting member 13, AF power-supply lines 171 and 172, and signal lines 173 and 174 are attached to magnet holder 121.

In attachment, terminal connection portions 131h and 132h of upper plate springs 131 and 132 are soldered and electrically connected to power-supply output terminals 162a and 162f of AF circuit board 162. Terminal connection portions 171d and 172d of AF power-supply lines 171 and 172 are soldered and electrically connected to power-supply input terminals 162b and 162e of AF circuit board 162. Terminal connection portions 173d and 174d of signal lines 173 and 174 are soldered and electrically connected to signal input terminals 162c and 162d of AF circuit board 162.

AF coil part 112, position-detecting magnets 15A and 15B, and lower plate spring 14 are attached to lens holder 111. After attachment of AF coil part 112, position-detecting magnets 15A and 15B, and lower plate spring 14, lens holder 111 is fitted in magnet holder 121 from the image formation side in the optical-axis direction. That is, lens holder 111 is disposed inside magnet holder 121 so that AF coil part 112 faces magnet part 122. Then, upper plate springs 131 and 132 are attached to lens holder 111, and lower plate spring 14 is attached to magnet holder 121. In addition, magnet part 122 is attached to magnet holder 121.

At this time, coil connection portion 131i of upper plate spring 131 is soldered and electrically connected to one end of AF coil part 112 tied to one of tying parts 111e of lens holder 111. Similarly, coil connection portion 132i of upper plate spring 132 is soldered and electrically connected to the other end of AF coil part 112 tied to the other one of tying parts 111e of lens holder 111.

Figure 11:
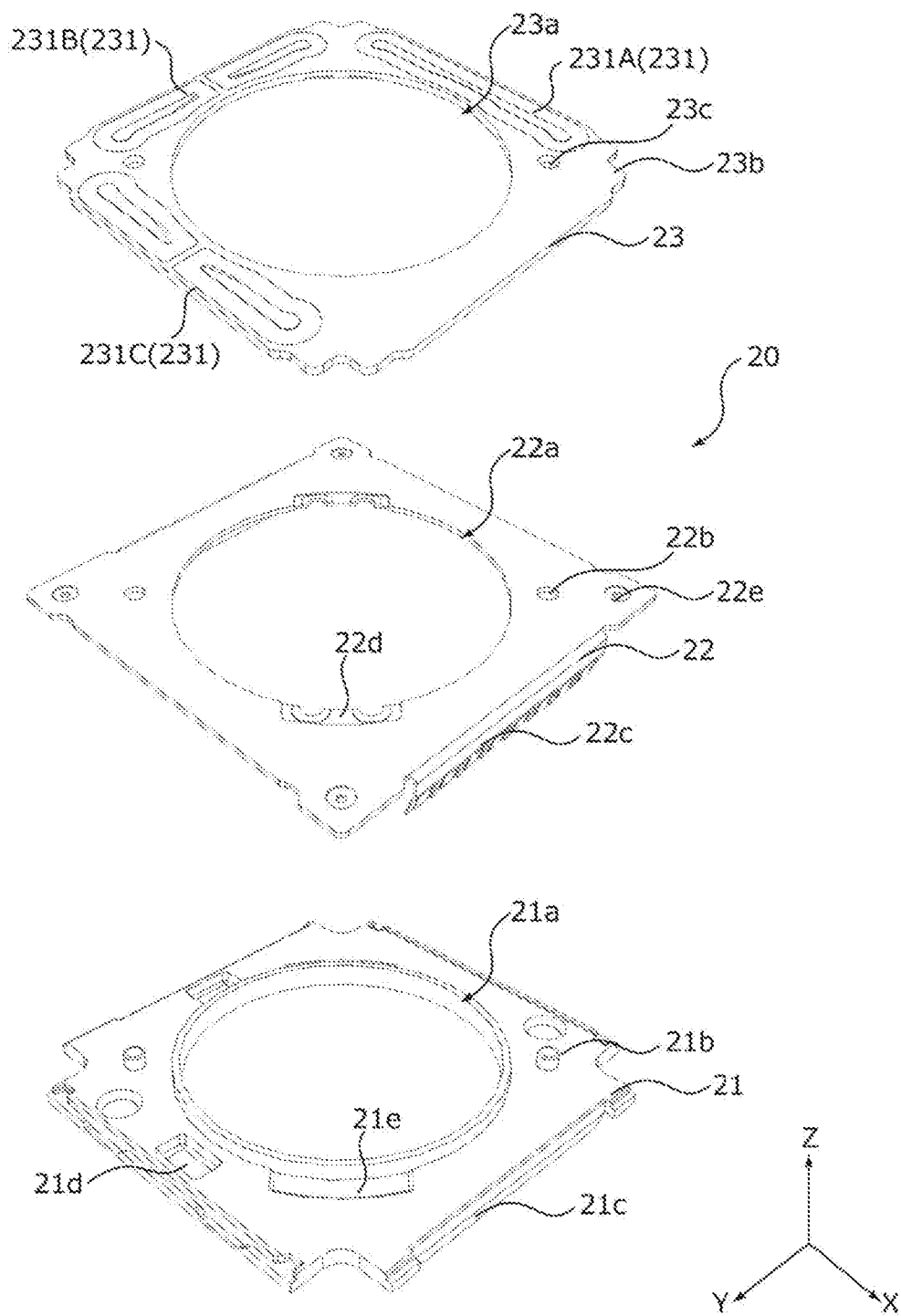
FIG. 11 is an exploded perspective view of an OIS fixing part of the lens driving device according to Embodiment 1.
Figure 12:
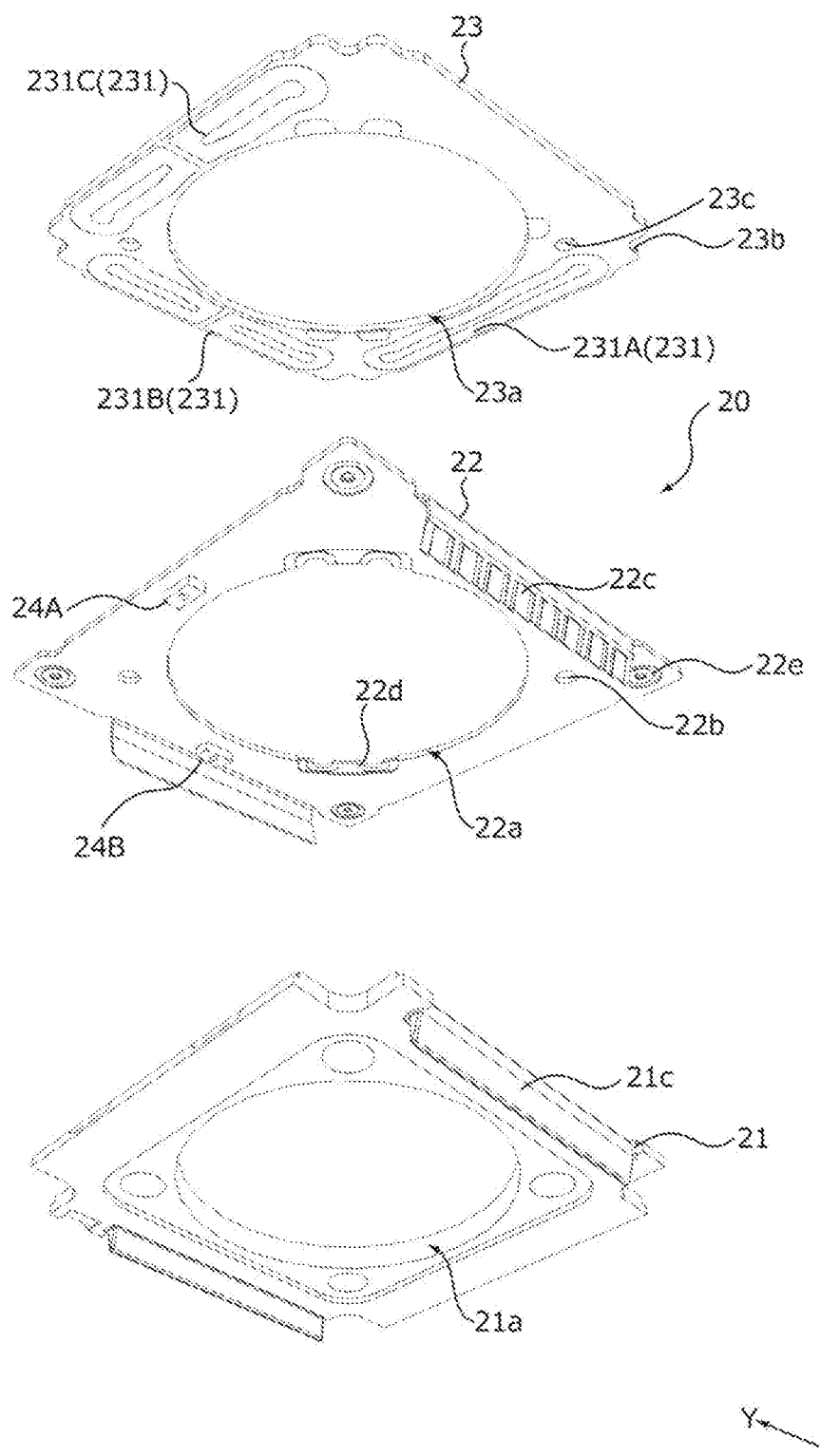
FIG. 12 is an exploded perspective view of the OIS fixing part of the lens driving device according to Embodiment 1.

FIGS. 11 and 12 are exploded perspective views of OIS fixing part 20. FIG. 11 is an upper perspective view and FIG. 12 is a lower perspective view. As illustrated in FIGS. 11 and 12, OIS fixing part 20 includes base 21, sensor board 22, coil board 23, XY-position detecting part 24, and the like.

Base 21 is a square member in plan view, and includes circular opening 21a at the center of base 21. Base 21 includes positioning bosses 21b on the rim portion of opening 21a at positions corresponding to the positions of positioning holes 23c of coil board 23 and positioning holes 22b of sensor board 22.

Base 21 includes depressed portions 21c in its peripheral edge portions at positions corresponding to control terminals 22c of sensor board 22. Depressed portions 21c have a tapered shape outwardly expanding in the direction of their lower portions. Base 21 also includes, at the rim portion of opening 21a, Hall-element housings 21d adapted to house Hall elements 24A and 24B, and terminal housings 21e adapted to house power-supply terminals 22d of sensor board 22.

Coil board 23, like base 21, is a board having a square shape in plan view and has circular opening 23a at its center. Coil board 23 includes cutouts 23b at the four corners. Coil board 23 also includes positioning holes 23c in the rim portion of opening 23a at two places where coil board 23 crosses the diagonal directions.

Coil board 23 includes OIS coil part 231 at positions where OIS coil part 231 faces magnet part 122 in the optical-axis direction. OIS coil part 231 includes three OIS coil parts 231A to 231C corresponding to magnets 122A to 122C. The sizes and positions of OIS coil parts 231A to 231C and of magnet 122A to 122C are set such that the magnetic fields radiated from the bottom surfaces of magnets 122A to 122C cross the long side portions of OIS coil parts 231A to 231C in the Z-direction, respectively. Magnet part 122 and OIS coil part 231 constitute the OIS voice coil motor.

Sensor board 22, like base 21, is a board having a square shape in plan view and has circular opening 22a at its center. Sensor board 22 has positioning holes 22b in the rim portion of opening 22a at positions corresponding to positioning holes 23c of coil board 23. Sensor board 22 includes, at two sides extending along the Y-direction, terminals 22c each formed to be bent downward. Terminals 22c are electrically connected to the image capturing part (not illustrated).

Sensor board 22 includes power-supply terminals 22d for supplying electricity to OIS coil part 231 at two places of the inner rim portion of opening 22a where the inner rim portion crosses the diagonal directions. Sensor board 22 includes, at its four corners, wire fixing holes 22e in which the other ends (lower ends) of suspension wires 30 are inserted.

Sensor board 22 also includes interconnection patterns including a power-supply line (not illustrated) for supplying electricity to OIS movable part 10 (AF control part 16) and to OIS coil part 231, a signal line (not illustrated) for detection signals to be output from XY-position detecting parts 24A and 24B, and a signal line (not illustrated) for control signals for controlling autofocus operation of OIS movable part 10. XY-position detecting parts 24A and 24B for detecting the position of OIS movable part 10 in the XY plane are disposed on the back surface of sensor board 22.

XY-position detecting parts 24A and 24B are, for example, Hall elements that utilize the Hall effect to detect the magnetic field (hereinafter, XY-position detecting parts 24A and 24B may also be referred to as "Hall elements 24A and 24B"). Hall elements 24A and 24B are disposed on the undersurface of sensor board 22 substantially at the midpoints of two adjacent sides of sensor board 22, respectively. The position of OIS movable part 10 in the XY plane can be specified by detecting the magnetic field formed by magnet part 122 by Hall elements 24A and 24B. Note that, another position-detecting magnet may also be disposed in OIS movable part 10 in addition to magnet part 122.

In OIS fixing part 20, coil board 23 and sensor board 22 are bonded to each other by soldering. In this way, OIS coil part 231 is electrically connected to the power-supply line (not illustrated) of sensor board 22.

Positioning bosses 21b of base 21 are fit in positioning holes 23c of OIS coil board 23 and in positioning holes 22b of sensor board 22, so that OIS coil board 23 and sensor board 22 are placed on base 21. Terminals 22c of sensor board 22 are engaged with depressed portions 21c of base 21, so that OIS coil board 23 and sensor board 22 are fixed to base 21.

In lens driving device 1, one ends of signal suspension wires 31A and 31B are inserted in and fixed by soldering to wire connection portions 174c and 173c of signal lines 174 and 173, respectively. One ends of power-supplying suspension wires 32A and 32B are inserted in and fixed by soldering to wire connection portions 172c and 171c of AF power-supply lines 172 and 171, respectively. In this way, suspension wires 30 are electrically connected to AF power-supply lines 171 and 172 and signal lines 173 and 174.

The other ends (lower ends) of suspension wires 30 are inserted in and fixed by soldering to wire fixing holes 22e of sensor board 22. In this way, suspension wires 30 are electrically connected to the power-source line and signal line of sensor board 22. That is, the supply of electricity to AF control part 16 and the operational control of AF control part 16 are made possible via suspension wires 30 and upper elastic supporting member 13.

Next, the magnet arrangement positions in magnet part 122 of lens driving device 1 according to the present embodiment will be described.

Figure 13A:
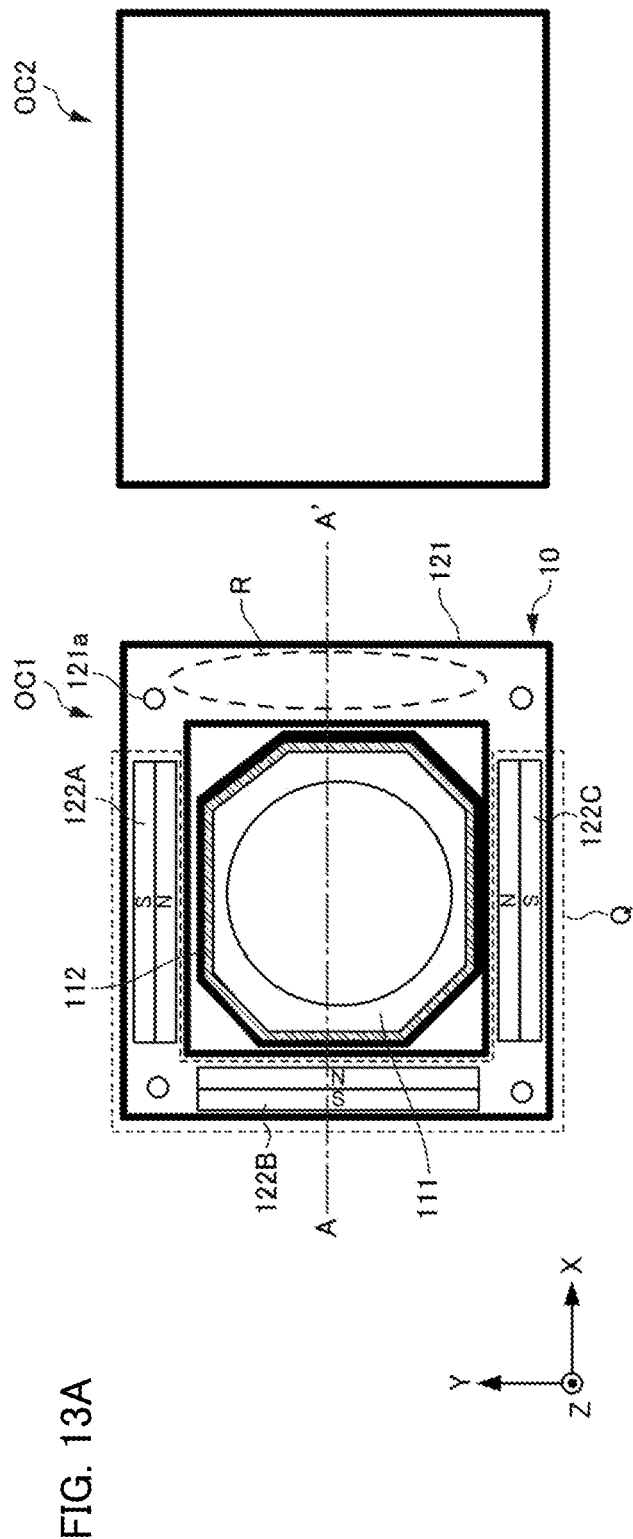
FIGS. 13A and 13B are explanatory views for explaining magnet arrangement positions of the lens driving device according to Embodiment 1.
Figure 13B:
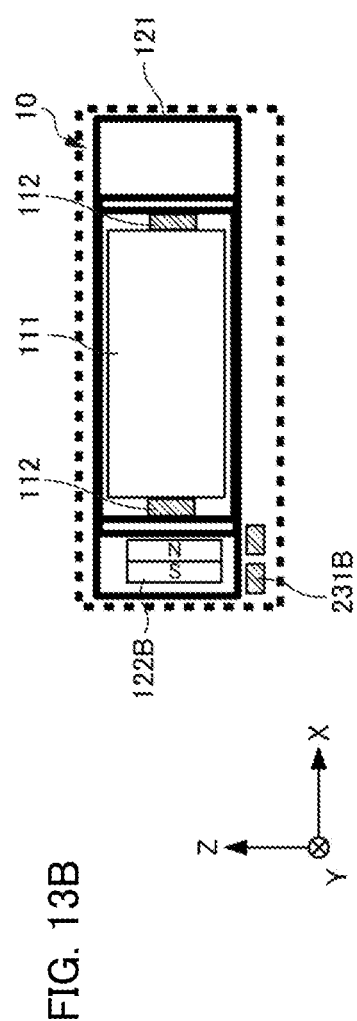

FIGS. 13A and 13B are explanatory views for explaining the magnet arrangement positions in magnet part 122 of lens driving device 1 according to the present embodiment. FIG. 13A is a plan view of lens driving device 1, and FIG. 13B is a sectional view of lens driving device 1 taken along axis A-A'. Note that, OC2 in FIG. 13A denotes the other lens driving device of an adjacent back side camera.

Magnets 122A to 122C are disposed at three of four sides of a rectangular outer edge portion of magnet holder 121 other than at one side adjacent to the other lens driving device. In other words, those three of four sides of the outer edge portion of magnet holder 121 serve as magnet disposing part Q and the one side adjacent to the other lens driving device serves as no-magnet-disposing part R in which none of magnets 122 is disposed. With this structure, the magnetic interference with the adjacent other lens driving device can be reduced.

Note that, of the two sides of the outer edge portion of magnet holder 121 positioned opposite each other in the X-direction, one side positioned on the +X-direction side corresponds to no-magnet-disposing part R and the other one positioned on the −X-direction side corresponds to magnet disposing part Q in FIGS. 13A and 13B. Two sides of the outer edge portion of magnet holder 121 positioned opposite each other in the Y-direction correspond to magnet disposing part Q. In other words, magnet 122B is disposed at one side positioned opposite no-magnet-disposing part R, and magnets 122A and 122C are disposed at two sides adjacent to no-magnet-disposing part R.

For example, permanent magnets each having the shape of a rectangular parallelepiped are applied as magnets 122A to 122C. According to the present embodiment, in order to miniaturize lens driving device 1 as a whole, magnets 122A to 122C are commonly used both for AF and for OIS, and form the magnetic fields radially crossing AF coil part 112 and the magnetic fields crossing OIS coil parts 231A to 231C in the optical-axis direction.

<Operation of Lens Driving Device>

When the shake correction is performed in lens driving device 1, OIS coil part 231 is energized. Specifically, in the OIS driving part, the energization current through OIS coil part 231 is controlled based on a detection signal from a shake detection part (not illustrated) (for example, a gyro sensor) such that the shake of camera module A can be canceled out. At this time, by feedback of the detection result of XY-position detecting parts 24A and 24B, it becomes possible to accurately control the sway of OIS movable part 10.

When OIS coil part 231 is energized, a Lorentz force is generated at OIS coil part 231 by interaction between the magnetic field of magnet part 122 and a current flowing through OIS coil part 231 (Fleming's left hand rule). The direction of the Lorentz force is a direction (X- or Y-direction) orthogonal both to the direction of the magnetic field (Z-direction) at one of the long side portions of OIS coil part 231 and to the direction of the current (Y- or X-direction). Since OIS coil part 231 is fixed, a reactive force is exerted on magnet part 122. With this reactive force serving as the driving force of the OIS voice coil motor, OIS movable part 10 including magnet part 122 sways in the XY plane, so that the shake correction is performed.

When automatic focusing is performed in lens driving device 1, AF coil part 112 is energized. The energization current through AF coil part 112 is controlled by AF control part 16 (control IC 161). Specifically, control IC 161 controls the energization current to AF coil part 112 based on the control signals provided via suspension wires 31A and 31B and signal lines 174 and 173 and based on the detection result of a built-in Hall element (not illustrated) included in control IC 161.

When AF coil part 112 is energized, the Lorentz force arises at AF coil part 112 by interaction between the magnetic field of magnet part 122 and the current flowing through AF coil 112 part. The direction of the Lorentz force is the direction (Z-direction) orthogonal both to the direction of the magnetic field (X- or Y-direction) and to the direction of current flowing through AF coil part 112 (Y- or X-direction). Since magnet part 122 is fixed, a reactive force acts on AF coil part 112. With this reactive force serving as the driving force of the AF voice coil motor, AF movable part 11 including AF coil part 112 moves in the optical-axis direction, so that focusing is performed.

In AF control part 16 of lens driving device 1, the closed loop control is performed based on the detection signal obtained by the built-in Hall element included in control IC 161. With the closed-loop control system, it is unnecessary to take into consideration the hysteresis characteristics of the voice coil motor, and it is possible to directly detect that the position of AF movable part 11 is stabilized. Moreover, the present invention is also applicable to automatic focusing of an image surface detection system. Thus, since the response performance is high, higher-speed automatic focusing operation can be achieved.

Here, in an non-energization state where automatic focusing is not being performed, AF movable part 11 is brought into a state where AF movable part 11 is suspended between the infinity position and the macro position by upper plate springs 131 and 132 and lower plate spring 14 (this state may hereinafter be referred to as "reference state"). That is, in OIS movable part 10, AF movable part 11 (lens holder 111) is elastically supported to be displaceable on both sides in the Z-direction while being positioned with respect to AF fixing part 12 (magnet holder 121) by upper plate springs 131 and 132 and lower plate springs 14.

When focusing is performed, the direction of current is controlled depending on whether AF movable part 11 is to be moved from the reference state toward the macro position side or the infinity position side. In addition, the magnitude of current is controlled depending on the moving distance of AF movable part 11.

In the case where AF movable part 11 moves toward the infinity position side during focusing, the undersurfaces of first stopper portions 111h of lens holder 111 approach the upper surface of magnet part 122, and eventually come into contact therewith. That is, the movement toward the infinity position side is restricted by the undersurfaces of first stopper portions 111h of lens holder 111 and the upper surface of magnet part 122.

Meanwhile, in the case where AF movable part 11 moves toward the macro position side during focusing, the upper surface of flange portion 111b of lens holder 111 approaches the undersurface of second stopper portion 121e of magnet holder 121, and comes eventually into contact therewith. That is, the movement toward the macro position side is restricted by the upper surface of flange portion 111b of lens holder 111 and the undersurface of second stopper portion 121e of magnet holder 121.

As described above, according to lens driving device 1 according to the present embodiment, as for the magnet arrangement positions in magnet part 122, magnet part 122 is substantially rectangular and three of the four side of magnet part 122 serve as no-magnet-disposing part R and one of the four sides serves as magnet disposing part Q, so that it is possible to reduce the magnetic interference with the other lens driving device disposed to be adjacent to lens driving device 1 on the side of no-magnet-disposing part R.

Embodiment 2

Next, lens driving device 1 according to Embodiment 2 will be described with reference to FIGS. 14A and 14B.

Figure 14A:
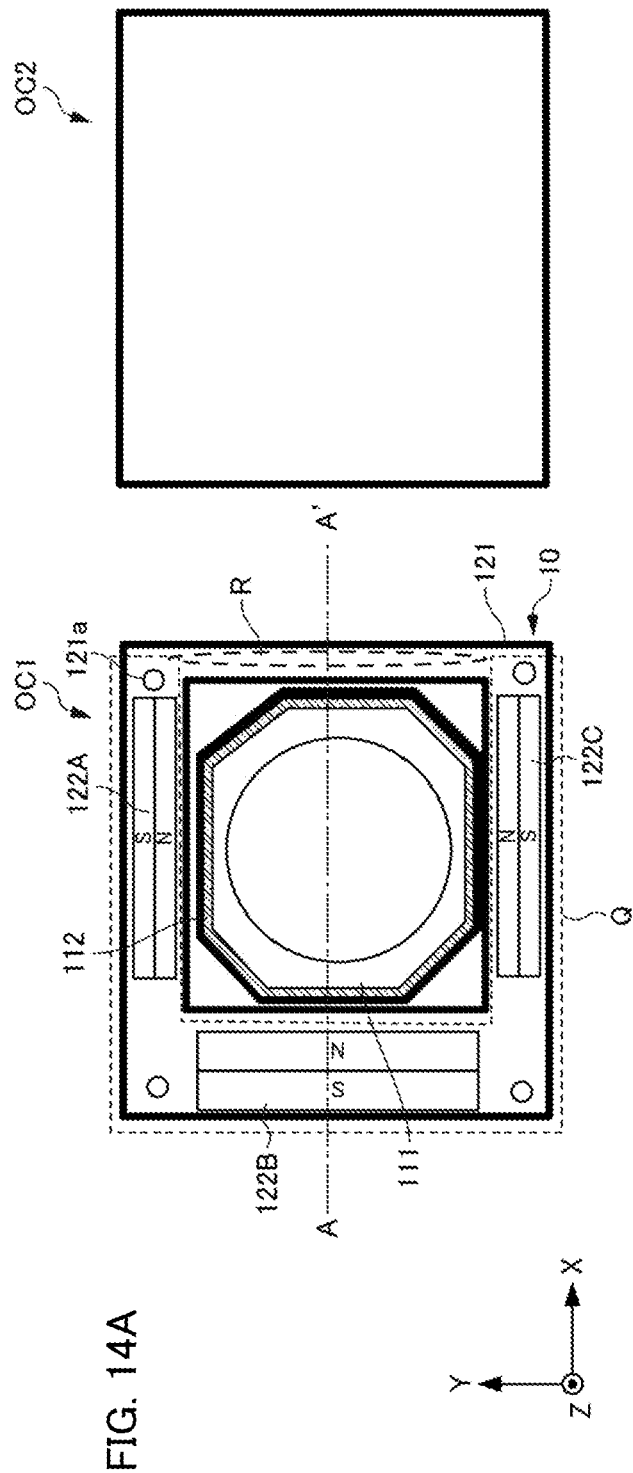
FIGS. 14A and 14B illustrate an example of configuration of a lens driving device according to Embodiment 2.
Figure 14B:
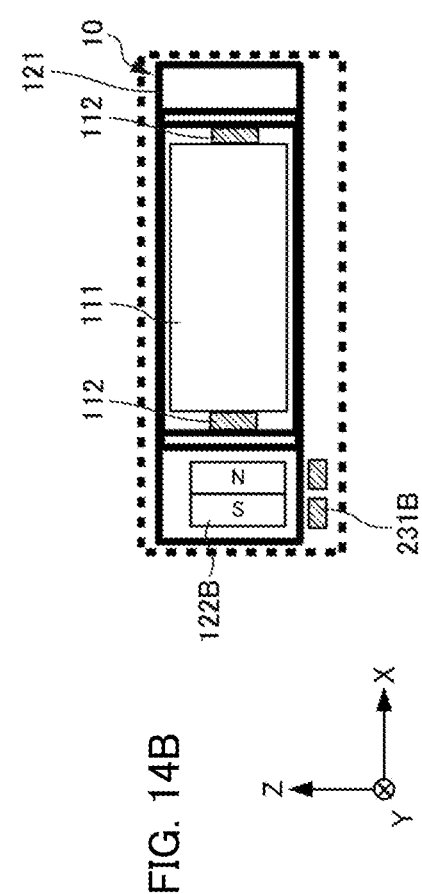

FIGS. 14A and 14B illustrate an example of configuration of lens driving device 1 according to the present embodiment. FIG. 14A is a plan view and FIG. 14B is a sectional view taken along axis A-A' in FIG. 14A.

Lens driving device 1 according to the present embodiment is identical to lens driving device 1 according to Embodiment 1 except that lens holder 111 is supported at a position shifted toward no-magnet-disposing part R of magnet holder 121 and that magnet 122B has a size greater than those of magnets 122A and 122C. Note that, the descriptions of the components common between Embodiments 1 and 2 will be omitted (hereinafter, the same applies to other embodiments).

Note that, illustration of OIS fixing part 20 is omitted in FIGS. 14A and 14B for convenience of description. Note however that, OIS coil parts 231A to 231C of OIS fixing part 20 are disposed respectively at positions spaced away in the optical-axis direction from magnets 122A to 122C in the same manner as in Embodiment 1 (hereinafter, the same applies to the other embodiments).

When no-magnet-disposing part R is provided, there is a risk that unnecessary resonance occurs during shake correction since the balance of weight between the four sides of OIS movable part 10 (magnet holder 121 and lens holder 111) in the XY plane is disturbed. In particular, since OIS movable part 10 is supported by a plurality of suspension wires 30 so as to be able to sway, OIS movable part 10 is in a condition where resonance occurs easily.

In addition, since OIS movable part 10 is driven in the X-direction using the magnetic field of magnet 122B alone, the shake correcting driving force in the X-direction is smaller.

Lens driving device 1 according to the present embodiment clears these conditions by the aforementioned configurations. That is, lens holder 111 is supported at a position shifted toward no-magnet-disposing part R of magnet holder 121, so that it is possible to keep the balance of weight between the four sides of OIS movable part 10 as a whole, so as to stabilize the condition for moving OIS movable part 10.

In addition, a space formed as a result that lens holder 111 is disposed at a position shifted toward no-magnet-disposing part R of magnet holder 121 is utilized for enlarging the size of magnet 122B while keeping the aforementioned balance of weight. With this configuration, it is possible to increase the magnetic field from magnet 122B acting on OIS coil part 231B, so as to increase the driving force in the X-direction. It is also possible to increase the magnetic field from magnet 122B acting on AF coil part 112, so as to increase the driving force in the optical-axis direction. Note here that, enlarging the size of magnet 122B means enlarging an area in which the magnetic field is generated or enlarging a magnetized area in order to increase the magnetic field in the X-direction acting on OIS coil part 231B.

As described above, according to lens driving device 1 according to the present embodiment, the magnetic interference to the other lens driving device can be reduced in the same manner as in Embodiment 1, and moreover, the condition for moving OIS movable part 10 during shake correction can be stabilized. In addition, it is then possible, by enlarging the size of magnet 122B, to increase the driving force in the X-direction in which no-magnet-disposing part R exists.

Embodiment 3

Next, lens driving device 1 according to Embodiment 3 will be described with reference to FIGS. 15A and 15B.

Figure 15A:
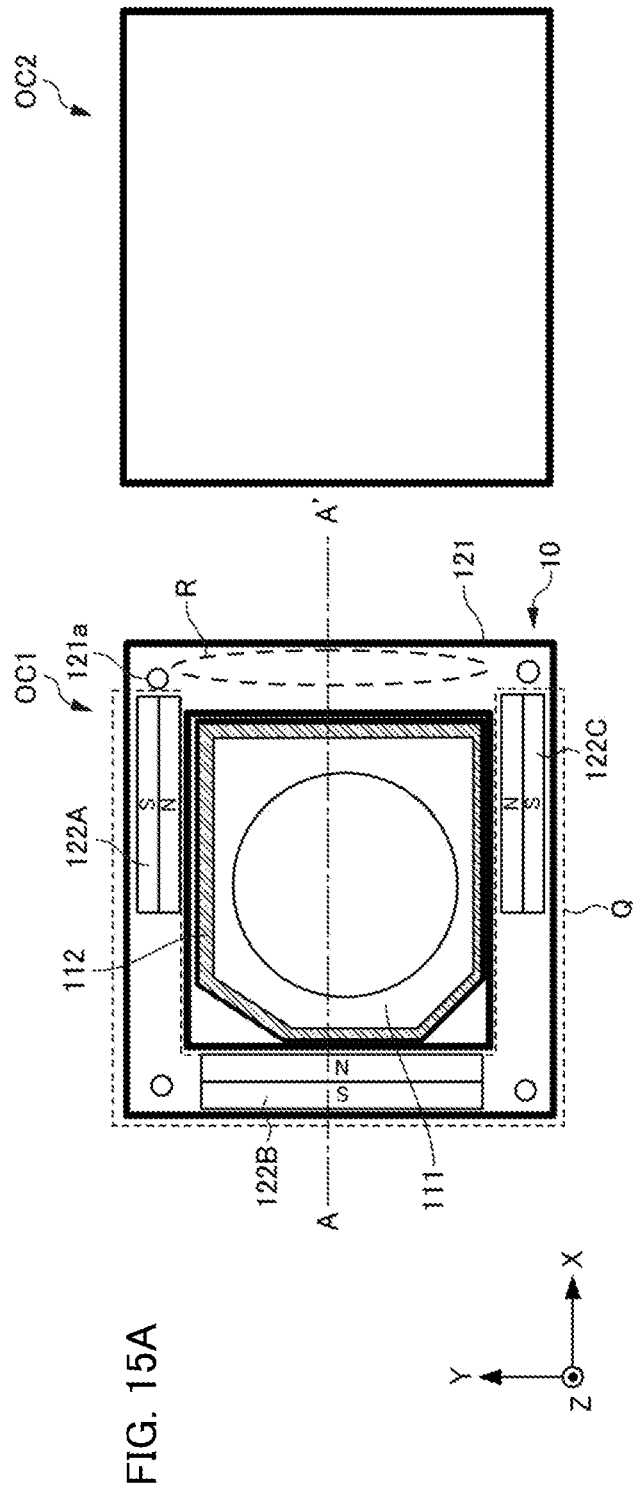
FIGS. 15A and 15B illustrate an example of configuration of a lens driving device according to Embodiment 3.
Figure 15B:
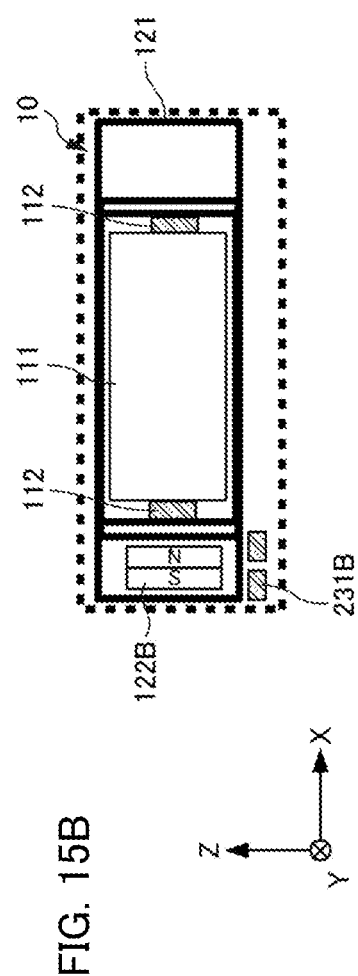

FIGS. 15A and 15B illustrate an example of configuration of lens driving device 1 according to the present embodiment. FIG. 15A is a plan view and FIG. 15B is a sectional view taken along axis A-A' in FIG. 15A.

Lens driving device 1 according to the present embodiment is identical to lens driving device according to Embodiment 1 except that AF coil part 112 and magnets 122A to 122C are configured such that the vector of the resultant force of the driving forces arising in AF coil part 112 in respective directions coincides with the optical-axis direction when an electric current is passed through AF coil part 112.

When no-magnet-disposing part R is provided, there is no driving force arising at a position of AF coil part 112 in the +X-direction when the electric current is passed through AF coil part 112, so that there is a risk that the vector of the resultant force of the driving forces arising in entire AF coil part 112 has a direction tilted in the +X-direction from the optical-axis direction (this tilt is hereinafter referred to as "AF tilt"). Automatic focusing is difficult when the AF tilt is caused.

Lens driving device 1 according to the present embodiment employs the following configurations in order to prevent the AF tilt.

Magnets 122A and 122C positioned on the two sides in the Y-direction are both disposed at positions shifted toward no-magnet-disposing part R relative to the center of lens holder 111. Moreover, the shape of AF coil part 112 is such that the region of AF coil part 112 facing magnet 122B positioned opposite no-magnet-disposing part R in the X-direction is smaller. To be more specific, AF coil part 112 has a hexagonal shape in plan view deformed from a rectangle such that the rectangle is convex on the side of magnet 122B. In other words, the shape of AF coil part 112 is such that the regions of AF coil part 112 respectively facing magnets 122A to 122C have substantially the same length.

With this configuration, the driving force generated by the interaction between the energization current through AF coil part 112 and the magnetic field arising from magnet 122A, the driving force generated by the interaction between the energization current through AF coil part 112 and the magnetic field arising from magnet 122B, and the driving force generated by the interaction between the energization current through AF coil part 112 and the magnetic field arising from magnet 122C can be balanced, so that the vector of the resultant force of the driving forces acting on AF movable part 11 (lens holder 111) can coincide with the optical axis. In other words, the moment acting on AF coil part 112 is canceled out.

However, the shape of AF coil part 112 may be the same as that of Embodiment 1 as long as the driving forces generated respectively by the interactions between the energization current through AF coil part 112 and the magnetic fields arising from magnets 122A, 122B, and 122C can be balanced by increasing the magnetic forces generated by magnets 122A and 122C, for example.

As described above, according to lens driving device 1 according to the present embodiment, the magnetic interference to the other lens driving device can be reduced in the same manner as in Embodiment 1, and moreover, it is possible to reduce the occurrence of AF tilt during automatic focusing.

Embodiment 4

Next, lens driving device 1 according to Embodiment 4 will be described with reference to FIGS. 16A and 16B.

FIGS. 16A and 16B illustrate an example of configuration of lens driving device 1 according to the present embodiment. FIG. 16A is a plan view and FIG. 16B is a sectional view taken along axis A-A' in FIG. 16A.

Lens driving device 1 according to the present embodiment is identical to lens driving device 1 according to Embodiment 1 except that balance weight 123 of a non-magnetic material is disposed in no-magnet-disposing part R.

As described above, when no-magnet-disposing part R is provided, there is a risk that unnecessary resonance occurs during shake correction since the balance of weight between the four sides of OIS movable part 10 (magnet holder 121 and lens holder 111) is disturbed. Accordingly, lens driving device 1 according to the present embodiment prevents unnecessary resonance during shake correction using the aforementioned configurations.

To be more specific, balance weight 123 is disposed in no-magnet-disposing part R in an attempt to keep the balance of weight between balance weight 123 and magnets 122A to 122C at the other three sides. A non-magnetic material having substantially the same weight and shape as each of magnets 122A to 122C of magnet part 122 can be used as balance weight 123, for example.

With this balance weight 123, the balance of weight between the four sides of OIS movable part 10 as a whole can be kept and, moreover, the condition for moving OIS movable part 10 during shake correction can be stabilized.

Embodiment 5

Next, lens driving device 1 according to Embodiment 5 will be described with reference to FIGS. 17A and 17B.

Figure 17A:
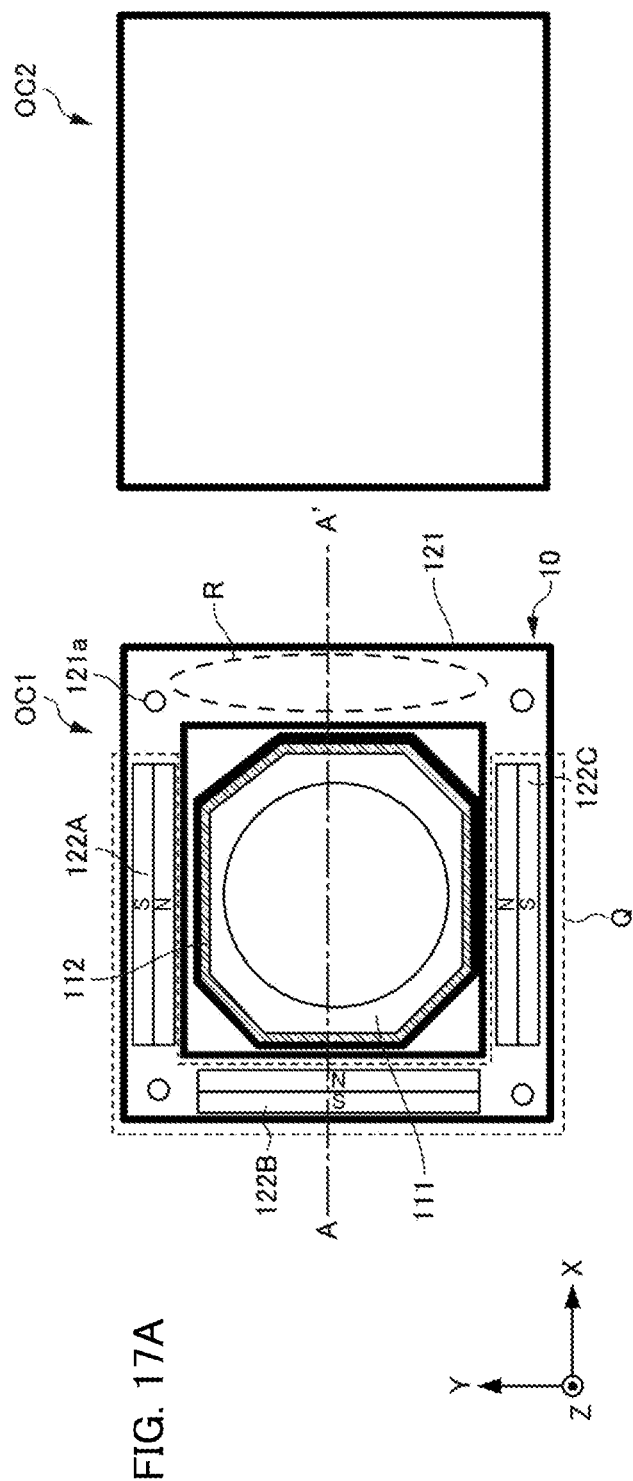
FIGS. 17A and 17B illustrate an example of configuration of a lens driving device according to Embodiment 5.
Figure 17B:
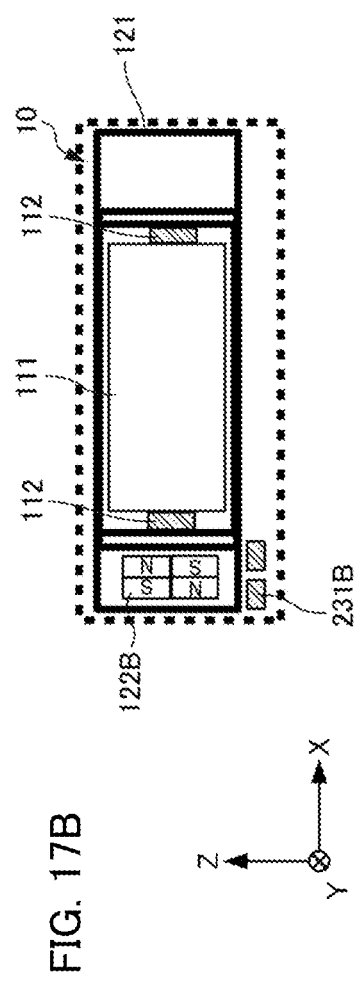

FIGS. 17A and 17B illustrate an example of configuration of lens driving device 1 according to the present embodiment. FIG. 17A is a plan view and FIG. 17B is a sectional view taken along axis A-A' in FIG. 17A.

Lens driving device 1 according to the present embodiment is identical to lens driving device 1 according to Embodiment 1 except that a magnet employed as magnet 122B at the side positioned opposite no-magnet-disposing part R is a magnet which has two poles on each face and which is magnetized such that a magnetized region of this magnet as seen in a section perpendicular to a longitudinal direction of this magnet is divided into two magnetized regions in the optical-axis direction while divided into two magnetized regions in the radial direction and adjacent pairs of the divided magnetized regions have magnetic poles different from each other. With this configuration, lens driving device 1 according to the present embodiment prevents the AF tilt.

To be more specific, the magnetized region of magnet 122B as seen in the XZ section of the rectangular parallelepiped is divided into two regions in the X-direction while divided into two regions in the Z-direction. In addition, magnet 122B is magnetized such that the magnetized regions of magnet 122B positioned on the +X side are set to S pole and N pole on the lower and upper sides, respectively, and the magnetized regions of magnet 122B positioned on the −X side are set to N pole and S pole on the lower and upper sides, respectively.

Note that, magnet 122B is disposed such that a region of magnet 122B facing AF coil part 112 is a middle region of magnet 122B along the magnetized regions divided in the Z-direction and a region of magnet 122B facing a winding of OIS coil part 231B positioned on the +X side and a region of magnet 122B facing a winding of OIS coil part 231B positioned on the −X side are the magnetized regions of different magnetic poles.

With this configuration, the effect of the magnetic field from magnet 122B acting on AF coil part 112 is reduced. Accordingly, the driving force is generated in AF coil part 112 during automatic focusing mainly by the effect of the magnetic fields generated by magnets 122A and 122C. That is, the AF tilt can be prevented since the vector of the resultant force of the driving forces acting on AF movable part 11 (lens holder 111) coincides with the optical axis.

As described above, according to lens driving device 1 according to the present embodiment, the magnetic interference to the other lens driving device can be reduced in the same manner as in Embodiment 1, and moreover, it is possible to reduce the occurrence of AF tilt during automatic focusing.

Embodiment 6

Next, lens driving device 1 according to Embodiment 6 will be described with reference to FIGS. 18A and 18B.

FIGS. 18A and 18B illustrate an example of configuration of lens driving device 1 according to the present embodiment. FIG. 18A is a plan view and FIG. 18B is a sectional view taken along axis A-A' in FIG. 18A.

Lens driving device 1 according to the present embodiment is identical to lens driving device 1 according to Embodiment 1 except that yoke 124 is interposed between magnet 122B positioned opposite no-magnet-disposing part R and AF coil part 112. With this configuration, lens driving device 1 according to the present embodiment prevents the AF tilt.

To be more specific, yoke 124 is disposed in magnet holder 121 in such a manner as to be interposed between magnet 122B and AF coil part 112. Yoke 124 is formed from a magnetic material and serves as a shield against the magnetic field from magnet 122B acting on AF coil part 112.

This yoke 124 reduces the effect of the magnetic field from magnet 122B acting on AF coil part 112, and a driving force is generated in AF coil part 112 during automatic focusing mainly by the effect of the magnetic fields generated by magnets 122A and 122C. In other words, the moment acting on AF coil part 112 is canceled out. This causes the vector of the resultant force of the driving forces acting on AF movable part 11 (lens holder 111) to coincide with the optical axis, so as to prevent the AF tilt.

As described above, according to lens driving device 1 according to the present embodiment, the magnetic interference to the other lens driving device can be reduced in the same manner as in Embodiment 1, and moreover, it is possible to reduce the occurrence of AF tilt during automatic focusing.

Embodiment 7

Next, lens driving device 1 according to Embodiment 7 will be described with reference to FIGS. 19A and 19B.

Figure 19A:
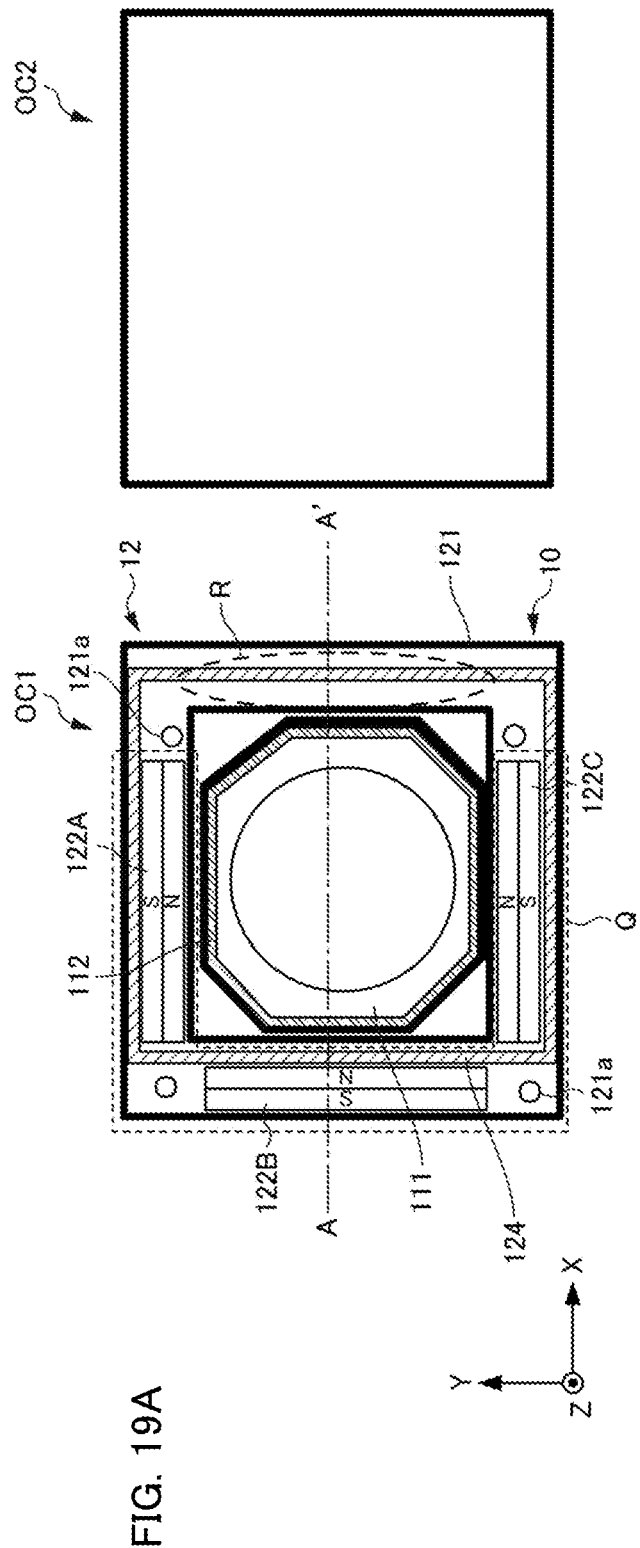
FIGS. 19A and 19B illustrate an example of configuration of a lens driving device according to Embodiment 7.
Figure 19B:
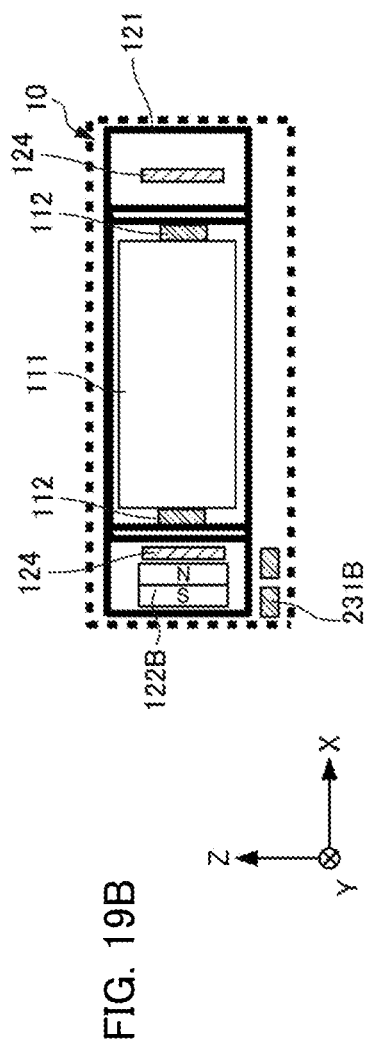

FIGS. 19A and 19B illustrate an example of configuration of lens driving device 1 according to the present embodiment. FIG. 19A is a plan view and FIG. 19B is a sectional view taken along axis A-A' in FIG. 19A.

Lens driving device 1 according to the present embodiment is identical to lens driving device 1 according to Embodiment 1 except that yoke 124 is disposed between magnet 122B and AF coil part 112. With this configuration, lens driving device 1 according to the present embodiment prevents the AF tilt.

To be more specific, yoke 124 according to the present embodiment is disposed to be interposed between magnet 122B and AF coil part 112 and to extend along the outer edge portion of magnet holder 121 from between magnet 122B and AF coil part 112 so as to peripherally surround magnets 122A and 122C disposed at two sides adjacent to no-magnet-disposing part R.

This yoke 124 reduces the effect of the magnetic field from magnet 122B acting on AF coil part 112, and a driving force is generated in AF coil part 112 during automatic focusing mainly by the effect of the magnetic fields generated by magnets 122A and 122C. Accordingly, the AF tilt can be prevented since the vector of the resultant force of the driving forces acting on AF movable part 11 (lens holder 111) coincides with the optical axis.

In addition, yoke 124 peripherally surrounds magnets 122A and 122C, so as to serve as a magnetic shield against the magnetism from magnets 122A and 122C toward the outside of lens driving device 1 and increase the strength of magnet holder 121.

Meanwhile, of the positions at which magnet holder 121 is supported by four suspension wires 30, the positions of two suspension wires 30 on the +X side in the X-direction are asymmetric with respect to the positions of the other two suspension wires 30 on the −X side in the X-direction in the present embodiment in order that loads acting on the members (upper elastic supporting member 13 and coil board 23) that fix four suspension wires 30 are balanced. To be more specific, the supporting positions of two suspension wires 30 positioned on the +X side are closer to the center of magnet holder 121 than the supporting positions of two suspension wires 30 positioned on the −X side are.

As described above, according to lens driving device 1 according to the present embodiment, the magnetic interference to the other lens driving device can be reduced in the same manner as in Embodiment 1, and moreover, it is possible to reduce the occurrence of AF tilt during automatic focusing.

Embodiment 8

Next, lens driving device 1 according to Embodiment 8 will be described with reference to FIGS. 20A to 20C.

FIGS. 20A to 20C illustrate an example of configuration of lens driving device 1 according to the present embodiment. FIG. 20A is a plan view, FIG. 20B is a sectional view taken along axis A-A' in FIG. 20A, and FIG. 20C is a sectional view taken along axis B-B' in FIG. 20A.

Lens driving device 1 according to the present embodiment is identical to lens driving device according to Embodiment 1 except that AF coil part 112 is composed of two coil parts 112A and 112B disposed respectively at positions facing magnets 122A and 122C of lens holder 111. With this configuration, lens driving device 1 according to the present embodiment prevents the AF tilt.

To be more specific, both of AF coil parts 112A and 112B are planar coils, are wound in the XZ plane, and have the shape of a flat plate extending in the X- and Z-directions. Additionally, AF coil parts 112A and 112B are disposed in lens holder 111 to face magnets 122A and 122C, respectively.

Each of magnets 122A and 122C has a structure in which each of magnets 122A and 122C is magnetized such that the magnetized region as seen in the YZ section is divided into two regions in the Y-direction while divided into two regions in the Z-direction and adjacent pairs of the divided magnetized regions have magnetic poles different from each other. Note that, magnet 122A is disposed such that a region of magnet 122A facing a winding of AF coil part 112A positioned on the +Z side and a region of magnet 122A facing a winding of AF coil part 112A positioned on the −Z side are the magnetized regions of different magnetic poles and such that a region of magnet 122A facing a winding of OIS coil part 231A positioned on the +Y side and a region of magnet 122A facing a winding of OIS coil part 231A positioned on the −Y side are the magnetized regions of different magnetic poles. Similarly, magnet 122C is disposed such that a region of magnet 122C facing a winding of AF coil part 112B positioned on the +Z side and a region of magnet 122C facing a winding of AF coil part 112B positioned on the −Z side are the magnetized regions of different magnetic poles and such that a region of magnet 122C facing a winding of OIS coil part 231C positioned on the +Y side and a region of magnet 122C facing a winding of OIS coil part 231C positioned on the −Y side are the magnetized regions of different magnetic poles.

With this configuration, the effect of the magnetic field from magnet 122B acting on AF coil parts 112A and 112B is reduced, and a driving force is generated in AF coil parts 112A and 112B during automatic focusing mainly by the effect of the magnetic fields generated by magnets 122A and 122C. Accordingly, the AF tilt can be prevented since the vector of the resultant force of the driving forces acting on AF movable part 11 (lens holder 111) coincides with the optical axis.

As described above, according to lens driving device 1 according to the present embodiment, the magnetic interference to the other lens driving device can be reduced in the same manner as in Embodiment 1, and moreover, it is possible to reduce the occurrence of AF tilt during automatic focusing.

However, in a case where automatic focusing is performed using two coil parts 112A and 112B as described in relation to the present embodiment, a driving force changes depending on positions of lens holder 111 in the optical-axis direction and, therefore, it is difficult to ensure the linearity of driving force. From this viewpoint, it is desirable that AF coil part 112 is configured to be wound around the outer peripheral surface of lens holder 111 as in the aforementioned embodiments.

Embodiment 9

Although a smartphone has been cited as an example of the camera mount device provided with camera module A in the aforementioned embodiments, lens driving device 1 according to the present invention is applicable to various information devices. For example, lens driving device 1 according to the present invention is applicable to note-type personal computer, a mobile game machine, a camera-equipped in-vehicle device, or the like.

Figure 21A:
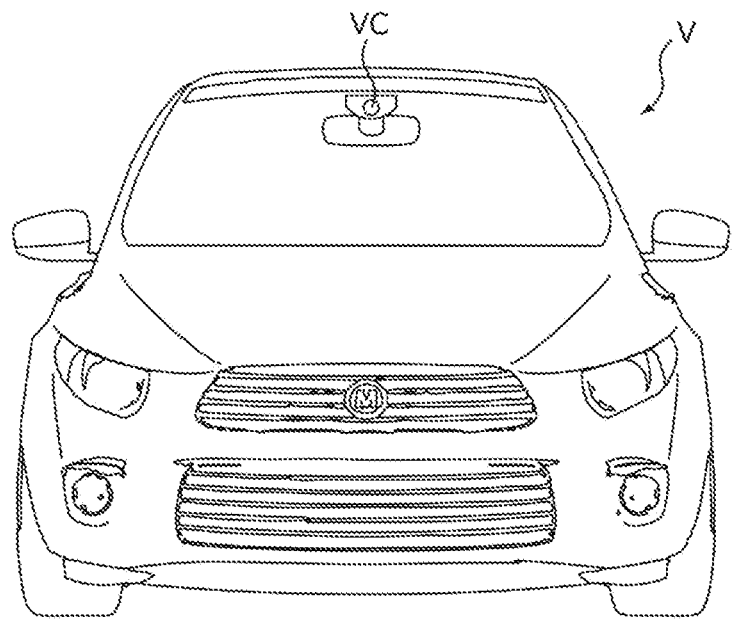
FIGS. 21A and 21B illustrate an example of configuration of a lens driving device according to Embodiment 9.
Figure 21B:
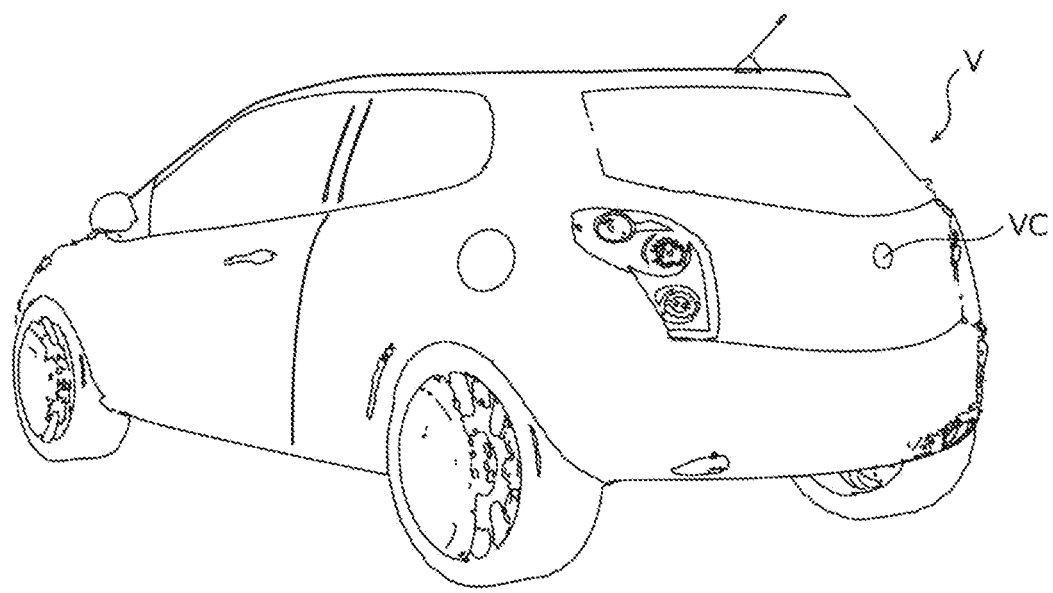

FIGS. 21A and 21B illustrate an example in which camera module A is applied to in-vehicle camera module VC (Vehicle Camera).

FIG. 21A is a front view of automobile V, and illustrates a state where in-vehicle camera module VC is attached to the windshield such that the lens part faces forward in the traveling direction.

Additionally, FIG. 21B is a rear view of automobile V, and illustrates a state where in-vehicle camera module VC is attached to the vehicle body such that the lens part faces rearward in the traveling direction. This in-vehicle camera module VC can be used for drive recording, collision avoidance control, automatic drive control, and the like.

Other Embodiments

The present invention is not limited to the above-described embodiments, and various modified aspects may be derived therefrom.

While magnet holder 121 having a substantially rectangular external shape as seen in plan view is used in an aspect of the aforementioned embodiments, magnet holder 121 having a hexagonal external shape, octagonal external shape, or the like as seen in plan view may be used. Even in the case of magnet holder 121 having a hexagonal external shape, octagonal external shape, or the like as seen in plan view, however, magnet part 122 is substantially rectangular in plan view and three of the four sides of magnet part 122 are to serve as magnet disposing part Q in which magnets are disposed and the remaining one side is to serve as no-magnet-disposing part R in which no magnet is disposed for the purpose of reducing the magnetic interference to the other lens driving device.

Additionally, in the aforementioned embodiments, an aspect in which the suspension wires are used as an example of OIS supporting member 30 for supporting lens holder 111 such that lens holder 111 is movable in the X- and Y-directions has been described. However, OIS supporting member 30 may be other than the suspension wires, and plate springs that support lens holder 111 on both sides of lens holder 111 in the X-direction and plate springs that support lens holder 111 on both sides of lens holder 111 in the Y-direction may be used, for example.

Additionally, in the aforementioned embodiments, an aspect in which the plate springs are used as an example of AF supporting members 13 and 14 for supporting lens holder 111 such that lens holder 111 is movable in the optical-axis direction has been described. However, AF supporting members 13 and 14 may be other than the plate springs, and a roller bearing or the like that supports lens holder 111 such that lens holder is movable in the optical-axis direction may be used, for example.

While concrete examples of the present invention have been described in detail above, those examples are mere examples and do not limit the scope of the appended claims. The techniques disclosed in the scope of the appended claims include various modifications and variations of the concrete examples exemplified above.

The description of the specification and the illustration of the accompanying drawings reveal at least the following matters.

Disclosed is lens driving device 1 including: an auto-focusing driving part including: first coil part 112 to be disposed at a periphery of a lens holder that holds a lens part; magnet part 122 to be disposed to be spaced apart in a radial direction from first coil part 112; first supporting members 13 and 14 configured to support, with respect to autofocus fixing part 12 including magnet part 122, autofocus movable part 11 including first coil part 112 such that autofocus movable part 11 is movable in the optical-axis direction, the auto-focusing driving part being configured to perform automatic focusing by utilizing a driving force of a voice coil motor composed of first coil part 112 and magnet part 122; and a shake-correcting driving part including: magnet part 122 to be disposed in the auto-focusing driving part; second coil part 231 to be disposed to be spaced apart in the optical-axis direction from magnet part 122; second supporting member 30 configured to support, with respect to shake-correcting fixing part 20 including second coil part 231, shake-correcting movable part 10 including magnet part 122 such that shake-correcting movable part 10 is movable in the optical-axis-orthogonal plane, the shake-correcting driving part being configured to perform shake correction by utilizing a driving force of a voice coil motor composed of second coil part 231 and magnet part 122. In lens driving device 1, magnet part 122 is substantially rectangular in plan view, and includes first magnets 122A and 122C to be disposed respectively at two opposite sides of four sides of magnet part 122 and second magnet 122B to be disposed at another side of the four sides, and a side opposite second magnet 122B is no-magnet-disposing part R in which no magnet is disposed.

According to this lens driving device 1, even when this lens driving device 1 is disposed adjacently to another lens driving device 1, one side adjacent to the other lens driving device 1 can be used as no-magnet-disposing part R, so that it is possible to prevent magnet part 122 included in lens driving device 1 from magnetically interfering with the other lens driving device 1.

Additionally, lens holder 111 in this lens driving device 1 may be disposed at a position shifted toward no-magnet-disposing part R inside magnet holder 121 that holds magnet part 122.

According to this lens driving device 1, since the balance of weight between the four sides of OIS movable part 10 as a whole can be kept, the occurrence of unnecessary resonance can be prevented and the condition for moving OIS movable part 10 during shake correction can be stabilized.

Additionally, second magnet 122B in this lens driving device 1 may have a size greater than a size of each of first magnets 122A and 122C.

According to this lens driving device 1, the driving force in the X-direction in which no-magnet-disposing part R exists can be increased during shake correction.

Additionally, first magnets 122A and 122C in this lens driving device 1 may be disposed at positions shifted toward no-magnet-disposing part R.

According to this lens driving device 1, it is possible to cause the vector of the resultant force of the driving forces acting on first coil part 112 to coincide with the optical axis of the lens during automatic focusing, so as to prevent the occurrence of AF tilt.

Additionally, the shape of first coil part 112 in this lens driving device 1 may be such that the regions of first coil part 112 respectively positioned opposite the second magnet and first magnets 112A and 122C have substantially the same length.

According to this lens driving device 1, it is possible to cause the vector of the resultant force of the driving forces acting on first coil part 112 to coincide with the optical axis of the lens during automatic focusing, so as to prevent the occurrence of AF tilt.

Additionally, in this lens driving device 1, a balance weight of a non-magnetic material may be disposed in no-magnet-disposing part R.

According to this lens driving device 1, since the balance of weight between the four sides of OIS movable part 10 as a whole can be kept, the occurrence of unnecessary resonance can be prevented and the condition for moving OIS movable part 10 during shake correction can be stabilized.

Additionally, second magnet 122B in this lens driving device 1 may be magnetized such that a magnetized region of second magnet 122B as seen in a section perpendicular to a longitudinal direction of second magnet 122B is divided into two magnetized regions in the optical-axis direction while divided into two magnetized regions in the radial direction and adjacent pairs of the divided magnetized regions have magnetic poles different from each other.

The magnet as described above is used as magnet 122B positioned at the side opposite no-magnet-disposing part R according to this lens driving device 1, so that it is possible to reduce a driving force to be generated by the magnetic field from this magnet 122B acting on AF coil part 112, so as to prevent the occurrence of AF tilt.

Additionally, this lens driving device 1 may further include yoke 124 interposed between second magnet 122B and first coil part 112.

According to this lens driving device 1, yoke 124 makes it possible to limit the magnetic field from second magnet 122B acting on AF coil part 112, so as to prevent the occurrence of AF tilt.

Additionally, yoke 124 in this lens driving device 1 may be disposed along the outer edge portion of magnet holder 121 so as to extend from between second magnet 122 and first coil part 112 to peripherally surround first magnets 112A and 122C.

According to this lens driving device 1, yoke 124 makes it possible to limit the magnetic field which is generated from second magnet 122B positioned at the side opposite no-magnet-disposing part R and which acts on AF coil part 112, so as to prevent the occurrence of AF tilt. In addition, yoke 124 can serve as a magnetic shield against the magnetism from magnets 122A and 122C toward the outside of lens driving device 1 and can increase the strength of magnet holder 121.

This application is entitled to and claims the benefit of Japanese Patent Application No. 2016-126022 dated Jun. 24, 2016, the disclosure of which including the specification, drawings and abstract is incorporated herein by reference in its entirety.

INDUSTRIAL APPLICABILITY

The lens driving device according to the present disclosure can be preferably used for dual cameras.

REFERENCE SIGNS LIST

1 Lens driving device
2 Cover
10 OIS movable part
11 AF movable part
111 Lens holder
112 AF coil part
12 AF fixing part
121 Magnet holder
122 Magnet part
13, 14 AF supporting member
15 Position-detecting magnet
16 AF control part
20 OIS fixing part
21 Base
22 Sensor board
23 Coil board
231 OIS coil part
30 OIS supporting member
A Camera module
R No-magnet-disposing part
Q Magnet disposing part

The invention claimed is:
1. A lens driving device, comprising:
an auto-focusing driving part including:
a first coil part to be disposed at a periphery of a lens holder that holds a lens part;
a magnet part to be disposed to be spaced apart in a radial direction from the first coil part; and
a first supporting member configured to support, with respect to an autofocus fixing part including the magnet part, an autofocus movable part including the first coil part such that the autofocus movable part is movable in an optical-axis direction, the auto-focusing driving part being configured to perform automatic focusing by utilizing a driving force of a voice coil motor composed of the first coil part and the magnet part; and
a shake-correcting driving part including:
the magnet part to be disposed in the auto-focusing driving part;
a second coil part to be disposed to be spaced apart in the optical-axis direction from the magnet part; and
a second supporting member configured to support, with respect to a shake-correcting fixing part including the second coil part, a shake-correcting movable part including the magnet part such that the shake-correcting movable part is allowed to sway in an optical-axis-orthogonal plane, the shake-correcting driving part being configured to perform shake correction by uti- lizing a driving force of another voice coil motor composed of the second coil part and the magnet part, wherein:
the magnet part is substantially rectangular in plan view and includes first magnets to be disposed respectively at two opposite sides of four sides of the magnet part and a second magnet to be disposed at a further side of the four sides, and a side positioned opposite the second magnet is a no-magnet-disposing part in which no magnet is disposed,
a balance weight of a non-magnetic material is disposed in the no-magnet-disposing part,
the second coil part includes a plurality of coils disposed to the shake-correction fixing part such that the plurality of coils face the respective first magnets at the two opposite sides of the four sides and the second magnet at the further side of the four side, the two opposite sides being adjacent to the side in which the balance weight is disposed, and the second coil part is not disposed in the side in which the balance weight is disposed, and
the first coil part includes a plurality of planar coils disposed to the lens holder such that the plurality of planar coils face the respective first magnets disposed in the two opposite sides which are adjacent to the side in which the balance weight is disposed, and the first coil part is not disposed in the side in which the balance weight is disposed nor in the further side which is opposite the side in which the balance weight is disposed.

2. The lens driving device according to claim 1, wherein the lens holder is disposed at a position shifted toward the no-magnet-disposing part inside a magnet holder that holds the magnet part.

3. The lens driving device according to claim 2, wherein the second magnet has a size greater than a size of each of the first magnets.

4. The lens driving device according to claim 1, wherein the first magnets are disposed at respective positions shifted toward the no-magnet-disposing part.

5. The lens driving device according to claim 4, wherein a shape of the first coil part is such that a region of the first coil part facing each of the first magnets and a region of the first coil part facing the second magnet have a length substantially the same as one another.

6. The lens driving device according to claim 1, wherein the second magnet is magnetized such that a magnetized region of the second magnet as seen in a section perpendicular to a longitudinal direction of the second magnet is divided into two magnetized regions in the optical-axis direction while divided into two magnetized regions in the radial direction, and wherein adjacent pairs of the divided magnetized regions have magnetic poles different from each other.

7. The lens driving device according to claim 1, further comprising:
a yoke to be interposed between the second magnet and the first coil part.

8. The lens driving device according to claim 7, wherein the yoke is disposed along an outer edge portion of the magnet holder so as to extend from between the second magnet and the first coil part to peripherally surround the first magnets.

9. A camera module, comprising:
the lens driving device according to claim 1.

10. A camera mount device, comprising:
the camera module according to claim 9.

* * * * *